(12) United States Patent
Sasaki

(10) Patent No.: US 7,016,289 B2
(45) Date of Patent: Mar. 21, 2006

(54) INFORMATION-PROCESSING APPARATUS, INFORMATION-RECORDING APPARATUS, INFORMATION-PROCESSING SYSTEM, INFORMATION- RECORDING METHOD, PROGRAM FOR INFORMATION RECORDING, AND STORAGE MEDIUM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/932,283

(22) Filed: Sep. 2, 2004

(65) Prior Publication Data

US 2005/0030873 A1 Feb. 10, 2005

Related U.S. Application Data

(63) Continuation of application No. PCT/JP04/003429, filed on Mar. 15, 2004.

(30) Foreign Application Priority Data

Mar. 25, 2003 (JP) .............................. 2003-083320
Sep. 29, 2003 (JP) .............................. 2003-336920

(51) Int. Cl.
G11B 5/09 (2006.01)
(52) U.S. Cl. ............................... 369/59.25; 369/275.3; 369/30.11
(58) Field of Classification Search ............ 369/59.25, 369/94, 53.31, 59.22, 275.4, 47.18, 30.11, 369/47.22, 275.3, 286, 47.27, 30.1, 30.15
See application file for complete search history.

(56) References Cited

U.S. PATENT DOCUMENTS

| 5,729,525 | A | | 3/1998 | Ishida et al. |
|---|---|---|---|---|
| 5,881,032 | A | * | 3/1999 | Ito et al. ..................... 369/30.1 |
| 5,930,225 | A | | 7/1999 | Ishida et al. |
| 5,966,721 | A | | 10/1999 | Hirayama et al. |
| 6,072,759 | A | | 6/2000 | Maeda et al. |
| 6,076,135 | A | | 6/2000 | Hirayama et al. |
| 6,154,806 | A | | 11/2000 | Hirayama et al. |
| 6,456,584 | B1 | | 9/2002 | Nagata et al. |
| 2002/0024902 | A1 | | 2/2002 | Sasaki |
| 2002/0114245 | A1 | | 8/2002 | Sasaki |
| 2002/0159353 | A1 | | 10/2002 | Sasaki |
| 2003/0033475 | A1 | | 2/2003 | Sasaki |
| 2003/0133369 | A1 | | 7/2003 | Sasaki |
| 2003/0163638 | A1 | | 8/2003 | Sasaki |
| 2003/0223338 | A1 | | 12/2003 | Sasaki |
| 2004/0057366 | A1 | | 3/2004 | Sasaki |
| 2004/0090886 | A1 | | 5/2004 | Sasaki |
| 2004/0133739 | A1 | | 7/2004 | Sasaki |
| 2004/0160875 | A1 | | 8/2004 | Sasaki |
| 2004/0213117 | A1 | | 10/2004 | Sasaki |

FOREIGN PATENT DOCUMENTS

| JP | 9-7308 | 1/1997 |
|---|---|---|
| JP | 9-69264 | 3/1997 |
| JP | 9-259438 | 10/1997 |

(Continued)

Primary Examiner—Ali Neyzari
(74) Attorney, Agent, or Firm—Dickstein Shapiro Morin & Oshinsky LLP

(57) ABSTRACT

An apparatus for processing information is disclosed. The apparatus requests for recording of user data into an information-recording apparatus for recording in an information-recording medium having multiple recording layers, each of the layers having a data area for recording the user data. The medium has a first recording layer to be a reference for determining a position of the data area in each of the recording layers, and a second recording layer excluding the first recording layer.

50 Claims, 14 Drawing Sheets

FOREIGN PATENT DOCUMENTS

| | | |
|---|---|---|
| JP | H9-259438 | 10/1997 |
| JP | 10-21673 | 1/1998 |
| JP | 11-031357 | 2/1999 |
| JP | 2000-004852 | 1/2000 |
| JP | 2000-36130 | 2/2000 |
| JP | 2000-048542 | 2/2000 |
| JP | 2000-48542 | 2/2000 |
| JP | 2000-67511 | 3/2000 |
| JP | 2000-293947 | 10/2000 |
| JP | 2001-126255 | 5/2001 |
| JP | 2001-167509 | 6/2001 |
| WO | WO 2004/086394 | 10/2004 |

* cited by examiner

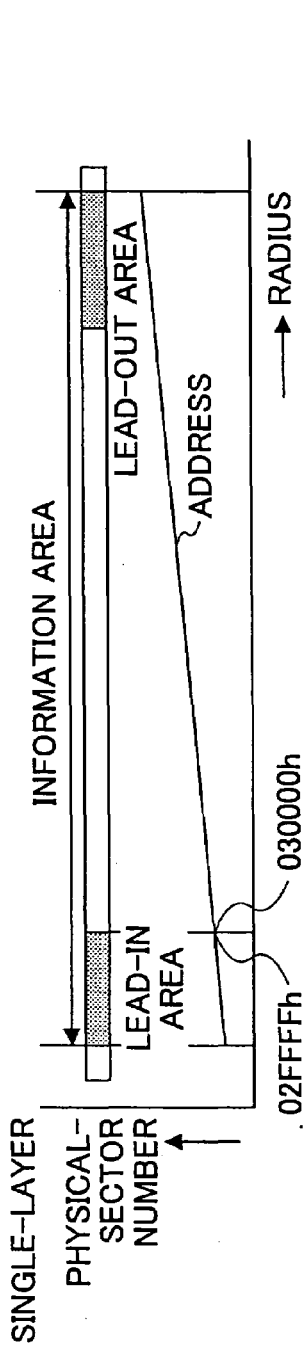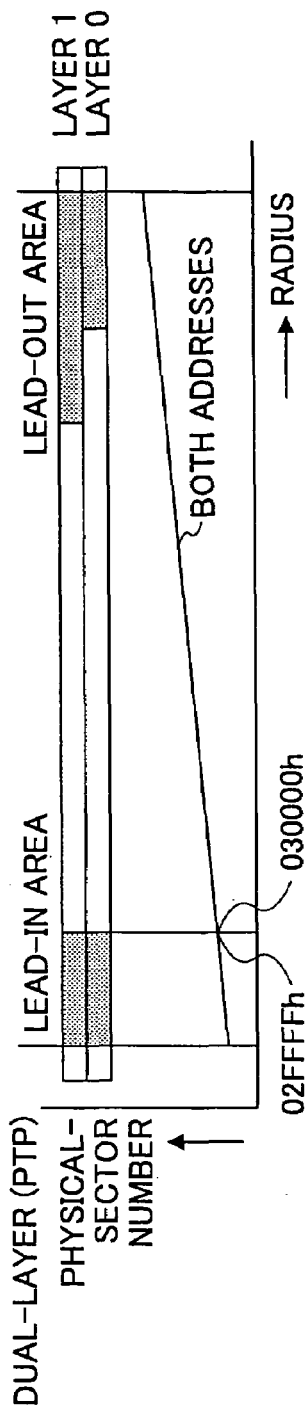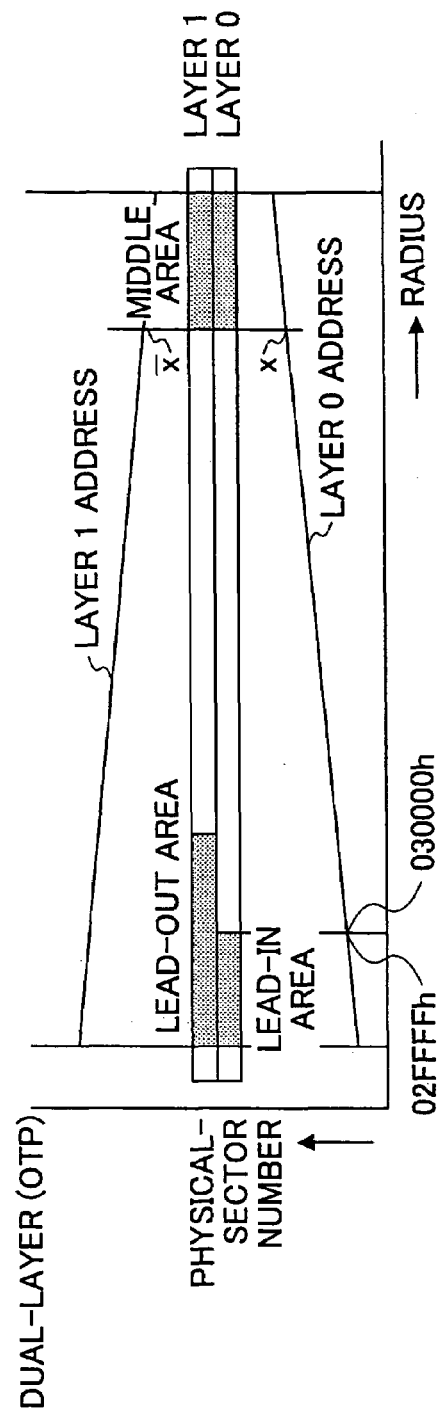

FIG.8

SDCB FORMAT

| PHYSICAL SECTOR OF ECC BLOCK | POSITION OF MAJOR DATA BYTES | DESCRIPTION | NUMBER OF BYTES |
|---|---|---|---|
| 0 | D0 to D3 | CONTENTS DESCRIPTOR | 4 |
| 0 | D4 to D7 | UNKNOWN CONTENTS DESCRIPTOR ACTION | 4 |
| 0 | D8 to D39 | DRIVE ID | 32 |
| 0 | D40 to D42 | SESSION NUMBER | 2 |
| 0 | D42 to D63 | RESERVED | 22 |
| 0 | D64 to D95 | DISK ID (LEAD-IN ZONE ONLY) | 32 |
| 0 | D96 to D127 | APPLICATION DEPENDENCE | 32 |
| 0 | D128 to D143 | SESSION ITEM 0 | 16 |
| 0 | ... | ... | |
| 0 | D128+I×16 to D143+I×16 | SESSION ITEM 1 | 16 |
| 0 | ... | ... | |
| 0 | D128+N×16 to D143(N-1)×16 | SESSION ITEM N | 16 |
| 0 | D128+N×16 to D2047 | RESERVED | 1920-N×16 |
| 1 to 15 | D0 to D2047 | RESERVED | 15×1048 |

FIG.9

FRAGMENT ITEM

| ITEM BYTE POSITION | DESCRIPTION | NUMBER OF BYTES |
|---|---|---|
| B0 to B3 | FRAGMENT ITEM DESCRIPTOR | 3 |
| B3 to B4 | FRAGMENT NUMBER | 2 |
| B5 to B7 | FRAGMENT START ADDRESS | 3 |
| B8 to B10 | FRAGMENT END ADDRESS | 3 |
| B11 to B15 | RESERVED | 5 |

FIG.10

PREVIOUS SESSION ITEM

| ITEM BYTE POSITION | DESCRIPTION | NUMBER OF BYTES |
|---|---|---|
| B0 to B2 | PREVIOUS SESSION ITEM DESCRIPTOR | 3 |
| B3 | RESERVED | 1 |
| B4 | PREVIOUS SESSION NUMBER | 1 |
| B5 to B7 | PREVIOUS SESSION START ADDRESS | 3 |
| B8 to B10 | PREVIOUS SESSION END ADDRESS | 3 |
| B11 to B15 | RESERVED | 5 |

FIG.11

LAYER ITEM

| ITEM BYTE POSITION | DESCRIPTION | NUMBER OF BYTES |
|---|---|---|
| B0 to B2 | LAYER ITEM DESCRIPTOR | 3 |
| B3 to B4 | LAYER NUMBER | 2 |
| B5 to B7 | LAYER START ADDRESS | 3 |
| B8 to B10 | LAYER END ADDRESS | 3 |
| B11 to B15 | RESERVED | 5 |

INFORMATION-PROCESSING APPARATUS, INFORMATION-RECORDING APPARATUS, INFORMATION-PROCESSING SYSTEM, INFORMATION- RECORDING METHOD, PROGRAM FOR INFORMATION RECORDING, AND STORAGE MEDIUM

CROSS-REFERENCE TO RELATED APPLICATION

This application is a U.S. continuation application filed under 35 USC 111(a) claiming benefit under 35 USC 120 and 365(c) of PCT application JP2004/003429, filed Mar. 15, 2004, which claims priority to Application Ser. No. 2003-083320, filed in Japan on Mar. 25, 2003 and Application Ser. No. 2003-336920, filed in Japan on Sep. 29, 2003. The foregoing applications are hereby incorporated herein by reference.

TECHNICAL FIELD

The present invention generally relates to a technology for optically recording information in an information-recording medium, and, more particularly, to an information-recording apparatus for recording information in a recordable information-recording medium such as a dual-layer DVD+R (Digital Versatile Disk+Recordable), etc.; an information-processing apparatus such as a PC connected to such information-recording apparatus so as to be used; and an information-processing system combining the apparatuses as described above, an information-recording method, a program for information recording, and a storage medium.

BACKGROUND ART

Recording-type DVD disks, consisting of a DVR+R as a recordable-type DVD disk and a DVD+RW as a rewritable-type DVD disk, etc., have high playback compatibility with a single-side single-layer playback-only DVD disk. Research and development activities for increasing the speed and the capacity of these recording-type disks have been actively carried out.

One of the recording-type disks as described above is a single-side dual-layer recordable DVD+R disk (below abbreviated as "a dual-layer DVD+R") having playback compatibility with a single-side dual-layer playback-only DVD disk. The dual-layer DVD+R with a recording capacity of 8.4 GB has almost twice the recording capacity of a conventional single-layer DVD+R with a recording capacity of 4.7 GB, and data recorded can be read out with a DVD player or a DVD-ROM drive enabled to reproduce data from the single-side dual-layer playback-only DVD disk.

Now, for the single-side dual-layer playback-only DVD disk, there are two types of track-path techniques, a Parallel Track Path (PTP) technique in which both the second-layer track and the first-layer track start at the inner radius and end at the outer radius, and an Opposite Track Path (OTP) technique in which the second-layer track starts at the outer radius and ends at the inner radius. In the PTP technique, the radial positions of the start addresses of the data areas of the first and the second layers are the same, both starting from a physical address of 30000H. Moreover, following the data area, a lead-out area is arranged. In the OTP method, the radial position of the start address of the second-layer data area is equal to the radial position of the end address of the first-layer data area, the physical address of the start position of the second-layer data area being an address in which the end address of the first-layer data area is bit-inverted. When there is a difference between the sizes of the first layer and the second layer data areas, the differential area becomes the lead-out area. For example, in a PTP disk, when the first-layer data-area end-address D1 and the second-layer data-area end-address D2 are such that D1>D2, the differential area D1–D2 becomes the lead-out area. Thus, the area having data recorded in the first recording layer also has data recorded in the corresponding area of the second layer. This is to avoid an occurrence of a problem such as not being able to obtain address information because data are not recorded at the identical radial position in the second layer, for example, at the time user tries to reproduce the first-layer data, and the reading laser happens to focus on the second layer while in a seek for a target address, resulting in the first-layer data not being able to be reproduced.

Furthermore, logical addresses in the dual-layer DVD are assigned continuously from the start address of the first-layer data area so that the logical addresses are continuous from the end address of the first-layer data area to the start address of the second-layer data area. In other words, when the user reproduces from the dual-layer DVD, designating a reproducing area using the logical addresses enables reproducing without needing to be aware of the recording layers.

Next, a process of recording when user data are recorded in the dual-layer DVD+R is described. In the DVD+R, for the user to record data, an initial-data area is preset so that the physical addresses are assigned in the same manner as the playback-only dual-layer DVD across the extent of the initial-data area. When data are recorded into such a dual-layer DVD+R, the user uses the logical addresses to designate the recording area in the same manner as the reproducing process. Therefore, when the user performs data recording continuously, the recording is started from the start address of the first-layer data area and, once the recording has been completed up to the end address of the first-layer data area, the recording is continued from the start address of the second-layer data area. Thus, even in the dual-layer DVD+R recording, the user is enabled to perform a recording without being aware of the recording layer.

Thus, it is possible that the data recording of the user terminates in the middle of the second-layer data area or without recording on the second layer at all. For example, when the data recording of the user is completed in the middle of the second-layer data area or in a state with an unrecorded area existing within the second-layer data area, it results in a disk layout being incompatible with the playback-only dual-layer DVD disk as described when an unrecorded area within the second-layer data area remains. Moreover, a problem arises such as not being able to obtain the address information because data are not recorded at the identical radial position in the second layer, for example, at the time the user tries to reproduce the first-layer data, and the reading laser happens to focus on the second layer while in a seek for the target address, resulting in the first-layer data not being able to be reproduced. Such problems apply in the same manner when the data recording of the user terminates without recording at all in the second layer.

On the other hand, as an example application of such a dual-layer DVD+R, there is a case in which it is used for test writing before mass producing the playback-only DVD disk. Normally, the data to be recorded in the DVDs, etc., are prepared on a hard disk. Subsequently, the data are recorded in an information-recording medium reproducible with a conventional player in order to validate whether the data have been prepared as data to be reproduced as intended by the preparer. As it is sufficient that the information-recording medium to be used for this validating task be of a small capacity, an information-recording medium recordable only once such as the DVD+R, etc., is often used. However, in the past, as the dual-layer recording disk had not existed, for the playback-only dual-layer DVD disk, the test writing in the recording-type DVD disk for validation could not be performed. Therefore, as described in Patent Document 1, a playback-only dual-layer DVD disk having arranged in the second layer temporary file management information is proposed. In the Patent Document 1 is described a validation process in which test writing is performed per recording layer for different recording disks so that the disk having recorded data in the second layer has the recording data referred to according to the temporary file information.

Thus, the example in the Patent Document 1 is such that the file format of the mass-produced playback-only dual-layer DVD itself is modified and in the validation process two recording-type DVD disks are recorded for validating the recording data per layer, making producing of a disk having a data structure completely identical to the playback-only DVD to be produced so as to perform a validation impossible. Moreover, in the validation according to the example in the Patent Document 1, the validation of data recorded on the second layer is performed according to the temporary file management information, making validation of the data recorded on the second layer from the file management information recorded on the first layer impossible.

Patent Document 1

JP2000-048542A

Now, while some process for the unrecorded area is considered to be necessary in order to avoid the problem of causing the unrecorded area as described above, a derivative problem arises in which, for instance, when the recording of the user data is completed with the second-layer data area almost unrecorded, or when the data recording is completed with no user data recorded at all in the second layer, etc., it results in a large unrecorded area so that a long time is required for the process of handling the unrecorded area.

Moreover, as for the validation, etc., as described above concerning the example application of the dual-layer DVD+R, while it is possible to resolve the problems as described above concerning the validation, etc., when using the dual-layer DVD+R, even in this case, in the dual-layer DVD+R, an initial-data area is preset for the user to record the data in, so that in order to record in a data format completely identical to the playback-only DVD to be produced, means for setting as the data area a random area out of the preset initial-data area is required, although a countermeasure concerning this point has yet to be proposed.

DISCLOSURE OF THE INVENTION

Accordingly, it is a general object of the present invention to provide a technology for optically recording information in an information recording medium that substantially obviates one or more problems caused by the limitations and disadvantages of the related art.

It is a more particular object of the present invention to provide an information-recording apparatus for recording information in a recordable information-recording medium such as a dual-layer DVD+R (Digital Versatile Disk+Recordable), etc., an information-processing apparatus such as a PC connected to such information-recording apparatus so as to be used, and an information-processing system combining the apparatuses as described above, an information-recording method, a program for information recording, and a storage medium that enable, in an operation of recording in an information-recording medium having multiple recording layers, flexible handling in accordance with the data size, etc., of user data regardless of the extent of the initial-data area preset.

According to the invention, an apparatus for processing information which requests for recording of user data into an information-recording apparatus for recording in an information-recording medium having multiple recording layers, the layers each having a data area for recording the user data, and having a first recording layer to be a reference for determining a position of the data area in each of the recording layers, and a second recording layer excluding the first recording layer, includes designating means for modifying the data area configured to make a designation to the information-recording apparatus regarding the size of the data area for the first recording layer within the extent of an initial-data area preset for the information-recording medium such that the data area to be used for the recording of the user data is allocated to the first recording layer and to the second recording layer.

An apparatus for processing information in an embodiment of the invention enables, in an operation of recording in an information-recording medium having multiple recording layers, flexible handling in accordance with the data size, etc., of user data regardless of the extent of the initial-data area preset.

According to another aspect of the invention, an apparatus for recording information which makes a recording based on a request from an information-processing apparatus for recording of user data in an information-recording medium having multiple recording layers, each of the layers having a data area for recording the user data, and having a first recording layer to be a reference for determining a position of the data area in the respective recording layers, and a second recording layer excluding the first recording layer, includes means for modifying the data area configured to make a setting regarding the size of the data area for the first recording layer within the extent of an initial-data area preset for the information-recording medium upon receiving a designation of modifying the data area from the information-processing apparatus.

An apparatus for recording information in an embodiment of the invention enables, in an operation of recording in an information-recording medium having multiple recording layers, flexible handling in accordance with the data size, etc., of user data regardless of the extent of the initial-data area preset.

According to another aspect of the invention, a system for processing information includes an apparatus for processing information which requests for recording of user data into an information-recording apparatus for recording in an information-recording medium having multiple recording layers, the layers each having a data area for recording the user data, and having a first recording layer to be a reference for determining a position of the data area in the respective recording layers, and a second recording layer excluding the first recording layer, including designating means for modifying the data area configured to make a designation to the information-recording apparatus regarding the size of the data area for the first recording layer within the extent of an initial-data area preset for the information-recording medium such that the data area to be used for the recording of the user data is allocated to the first recording layer and to the second recording layer, and an apparatus for recording information which makes a recording based on a request from an information-processing apparatus for recording of user data in an information-recording medium having multiple recording layers, each of the layers having a data area for recording the user data, and having a first recording layer to be a reference for determining a position of the data area in the respective recording layers, and a second recording layer excluding the first recording layer, including means for modifying the data area configured to make a setting regarding the size of the data area for the first recording layer within the extent of an initial-data area preset for the information-recording medium upon receiving a designation of modifying the data area from the information-processing apparatus.

A system for processing information in an embodiment of the invention enables, in an operation of recording in an information-recording medium having multiple recording layers, flexible handling in accordance with the data size, etc., of user data regardless of the extent of the initial-data area preset.

According to another aspect of the invention, a method of recording information for recording in an information-recording medium having multiple recording layers, each of the layers having a data area for recording the user data, and having a first recording layer to be a reference for determining a position of the data area in the respective recording layers, and a second recording layer excluding the first recording layer, includes the step of modifying data areas for making a setting regarding the size of the data area for the first recording layer within the extent of an initial-data area preset for the information-recording medium.

A method of recording information in an embodiment of the invention enables, in an operation of recording in an information-recording medium having multiple recording layers, flexible handling in accordance with the data size, etc., of user data regardless of the extent of the initial-data area preset.

According to another aspect of the invention, a method of recording information for making a recording based on a request from an information-processing apparatus for recording of user data in an information-recording medium having multiple recording layers, each of the layers having a data area for recording the user data, and having a first recording layer to be a reference for determining a position of the data area in the respective recording layers, and a second recording layer excluding the first recording layers includes the step of modifying the data area for making a setting regarding the size of the data area for the first recording layer within the extent of an initial-data area preset for the information-recording medium upon receiving a designation of modifying the data area from the information-processing apparatus.

A method of recording information in an embodiment of the invention enables, in an operation of recording in an information-recording medium having multiple recording layers, flexible handling in accordance with the data size, etc., of user data regardless of the extent of the initial-data area preset.

According to another aspect of the invention, a program for recording information is installed in a computer provided in an information-recording apparatus for making a recording based on a request from an information-processing apparatus for recording of user data in an information-recording medium having multiple recording layers, each of the layers having a data area for recording the user data, and having a first recording layer to be a reference for determining a position of the data area in the respective recording layers, and a second recording layer excluding the first recording layer, and causing the computer to execute a function of modifying data areas for making a setting regarding the size of the data area for the first recording layer within the extent of an initial-data area preset for the information-recording medium upon receiving a designation of modifying of the data area from the information-processing apparatus.

A program for recording information in an embodiment of the invention enables, in an operation of recording in an information-recording medium having multiple recording layers, flexible handling in accordance with the data size, etc., of user data regardless of the extent of the initial-data area preset.

BRIEF DESCRIPTION OF THE DRAWINGS

Other objects, features, and advantages of the present invention will become more apparent from the following detailed descriptions when read in conjunction with the accompanying drawings, in which:

FIG. 2A is a descriptive diagram illustrating an example layout of a playback-only DVD disk;

FIG. 2B is a descriptive diagram illustrating another example layout of the playback-only DVD disk;

FIG. 2C is a descriptive diagram illustrating yet another example layout of the playback-only DVD disk;

FIG. 8 is a table illustrating an example format of a SDCB;

FIG. 9 is a table illustrating an example format of a Fragment Item;

FIG. 10 is a table illustrating an example format of a Previous Session Item;

FIG. 11 is a table illustrating an example format of a Layer Item;

BEST MODE FOR CARRYING OUT THE INVENTION

Figure 1:
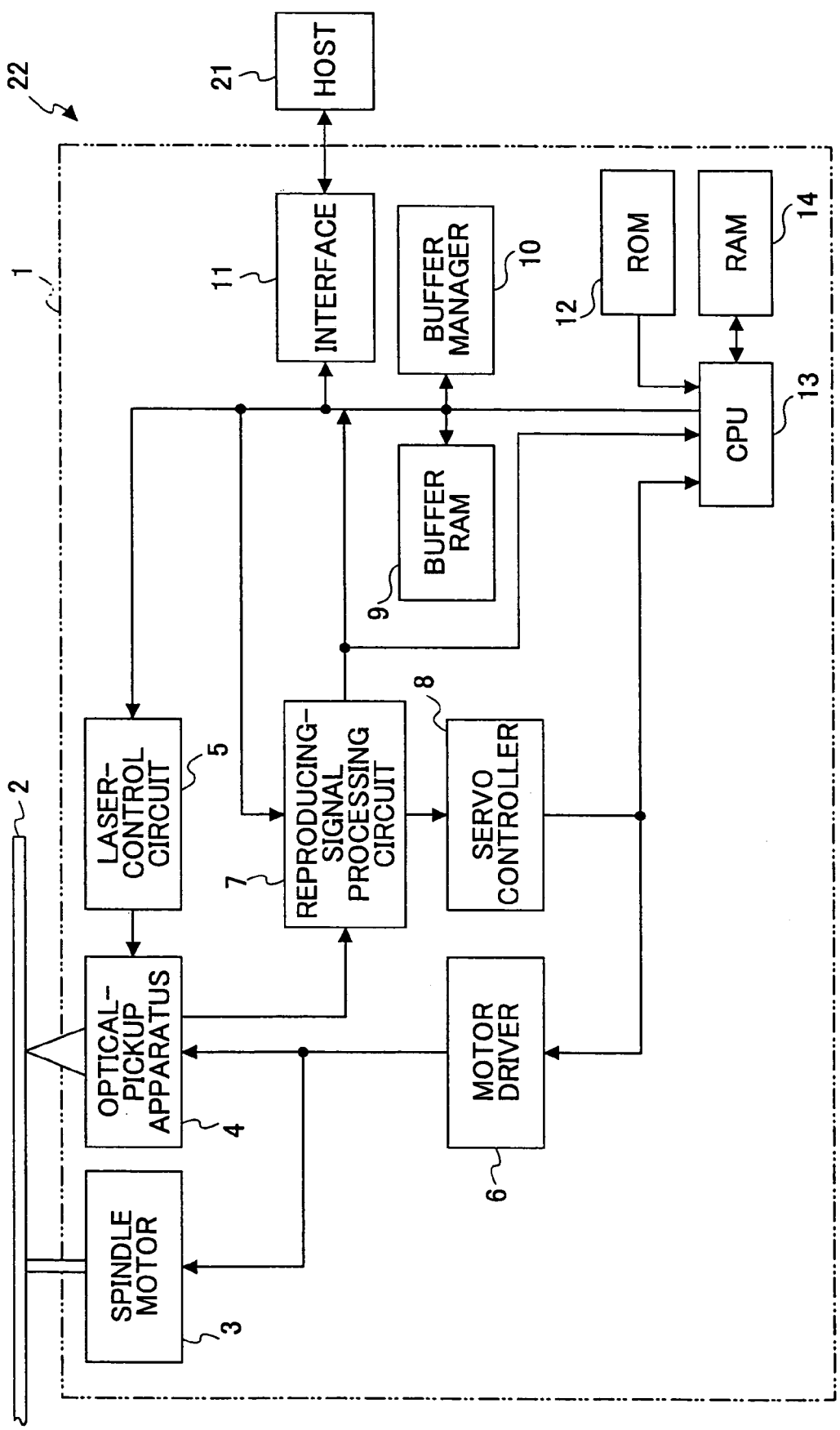
FIG. 1 is a block diagram illustrating a schematic configuration of an optical-disk apparatus and an information-processing system according to an embodiment of the invention.

Below, specific descriptions are given based on the accompanying drawings, on an embodiment for carrying out the present invention. FIG. 1 is a block diagram illustrating a schematic configuration of an optical-disk apparatus 1 as an information-processing apparatus according to an embodiment of the invention.

This optical-disk apparatus 1 is provided with a spindle motor 3 for rotationally driving an optical disk 2 as an information-recording medium, an optical-pickup apparatus 4, a laser-control circuit 5, a motor driver 6, a reproducing-signal processing circuit 7, a servo controller 8, a buffer RAM 9, a buffer manager 10, an interface 11, a ROM 12, a CPU 13 and a RAM 14, etc. It is to be noted that arrows illustrated within FIG. 1 illustrate representative flows of signals/information and not all of the interconnecting relationships among the respective blocks.

More specifically, first as for the optical disk 2, an example application for recording into a DVD+R standards-compatible dual-layer DVD+R is provided.

The optical-pickup apparatus 4 is configured to include a semiconductor laser as a beam source, an optical system including an objective lens, etc., for guiding a laser beam emitted from this semiconductor laser onto a recording surface of the optical disk 2 as well as for guiding a returned beam reflected at the recording surface, an optical detector arranged at the optical-detecting position so as to optically-detect the returned beam, and a driving system (a focusing actuator, a tracking actuator, a seek motor, etc.) (not shown), etc. At the optical-detector, an electric current (an electric-current signal) depending on the amount of the optical detection is output to the reproducing-signal processing circuit 7.

The servo controller 8 generates a control signal for controlling the focusing actuator of the optical-pickup apparatus 4 based on a focus-error signal, and generates a control signal for controlling the tracking actuator of the optical-pickup apparatus 4 based on a track-error signal. These control signals are output at the servo controller 8 to the motor driver 6.

The motor driver 6 drives the focusing actuator and the tracking actuator of the optical-pickup apparatus 4 based on the control signals from the servo controller 8. Moreover, the motor driver 6 controls the spindle motor 3 based on instructions of the CPU 13 so that the linear velocity of the optical disk 2 is set to be constant. Furthermore, the motor driver 6 drives the seek motor for the optical-pickup apparatus 4 and moves the optical-pickup apparatus 4 toward a target track of the optical disk 2 in the radial direction.

The interface 11 is a bi-directional communications interface with a host (information-processing apparatus) 21 such as a PC, for instance.

The CPU 13, along with the ROM 12 and the RAM 14, constitute a microcomputer (a computer) provided in the optical-disk apparatus 1 as described above. The ROM 12 which also serves as a storage medium has stored programs including a program for recording information as described below described in a code readable by the CPU 13. The CPU 13 controls the respective operations of each section as described above based on the program stored in the ROM 12, and temporarily stores in the RAM 14 the data, etc., necessary for control. It is to be noted that once the power of the optical-disk apparatus 1 is turned on, the program being stored in the ROM 12 is loaded (installed) into a main memory of the CPU 13 (not shown).

Herein, the optical-disk apparatus 1 according to the present embodiment being connected to the host 21 constitutes an information-processing system 22.

Prior to describing the present embodiment feature of a recording-process control, in case a dual-layer DVD+R as the target optical disk 2 is mounted in the optical-disk apparatus 1 and there is a request for recording of user data from the host 21 side, a layout, etc., of a playback-only DVD disk as a premise of the DVD+R standards is described.

First, an example layout of a playback-only DVD disk is described in FIG. 2A through 2C. FIG. 2A illustrates a single-side single-layer disk (below called "a single-layer disk"), FIG. 2B illustrates a single-side dual-layer disk according to a PTP technique (below called "a PTP disk", and FIG. 2C illustrates a single-side dual-layer disk according to an OTP technique (below called "an OTP disk").

The DVD disk basically has an information area consisting of a lead-in area, a data area, and a lead-out area, and has an information area per recording layer in case of the single-layer disk and the PTP disk. The OTP disk consists of one information area and has a middle area following the data area of layer 0 and preceding the data area of layer 1. Data reproducing is performed, from the inner radius to the outer radius for the single-layer disk, layers 0 and 1 of the PTP disk, and layer 0 of the OTP disk, and from the outer radius to the inner radius for the layer 1 of the OTP disk. The recording layers of the single-layer disk and the PTP disk are each assigned physical addresses (physical sector numbers) which are continuous from the lead-in area to the lead-out area. On the other hand, for the OTP disk, while continuous addresses are assigned from the lead-in area to the middle area of the layer 0, the physical addresses of the layer 1 are assigned the bit-inverted physical addresses of the layer 0 are so that the physical address increases from the middle area to the lead-out area. In other words, the start address of the data area in the layer 1 is an address having bit-inverted the end address in the layer 0.

As illustrated in FIG. 2B, in the PTP disk for each recording layer, the start and the end addresses of the lead-in area, the start address of the data area, and the end address of the lead-out area are in the identical respective radial positions, and the start address of the lead-out area, or the end address of the data area may differ per recording layer. When the end address of the data area differs, the differential area has the lead-out recorded.

On the other hand, as illustrated in FIG. 2C, for the OTP disk, the start address of the lead-in area and the end address of the lead-out area, the data-area end address of the layer 0 and the data-area start address of the layer 1, and the start and end addresses of the middle area of the respective recording layers are in the identical radial positions, and the data-area start address of the layer 0 and the data-area end address of the layer 1 do not necessarily correspond. Also for the OTP disk, its differential area has the lead-out recorded.

Herein, prior to describing the feature of the present embodiment, an example process of handling an unrecorded area that may result within the dual-layer DVD+R (the optical disk 2), for example, is described as a reference example with reference to FIGS. 3A through 3D and FIGS. 4A through 4D. First, an example process of handling an unrecorded area for the dual-layer DVD+R (the optical disk 2) according to the PTP technique, for example, complying with the playback-only DVD disk layout is described with reference to FIGS. 3A through 3D.

Figure 3A:
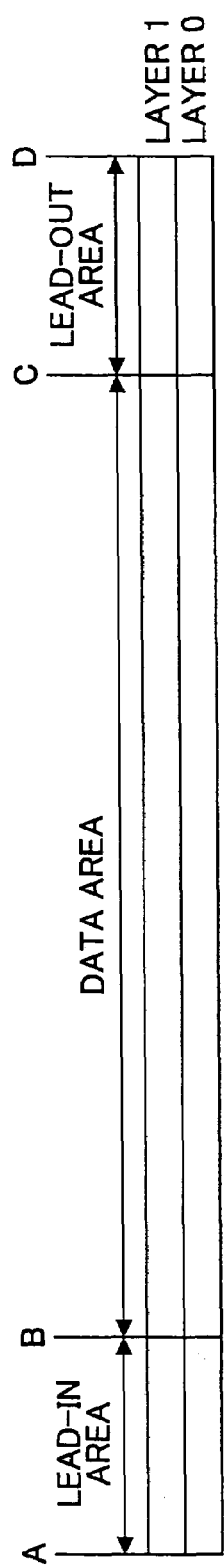
FIG. 3A is a descriptive diagram schematically illustrating an example process of handling an unrecorded area for a dual-layer DVD+R according to the PTP technique.

First, FIG. 3A illustrates a layout of a dual-layer DVD+R in an unrecorded state without recording at all. In the respective recording layers of layer 0 as a first recording layer and layer 1 as s second recording layer, a lead-in area, a data area, and a lead-out area exist. In FIG. 3A, A indicates the position of the lead-in start address, B indicates the start address of the data area, C indicates the start address of the lead-out area, and D indicates the end address of the lead-out area, and the addresses A through D in the respective recording layers (layer 0, 1) are positioned in the identical radial positions of the optical disk 2.

Figure 3B:
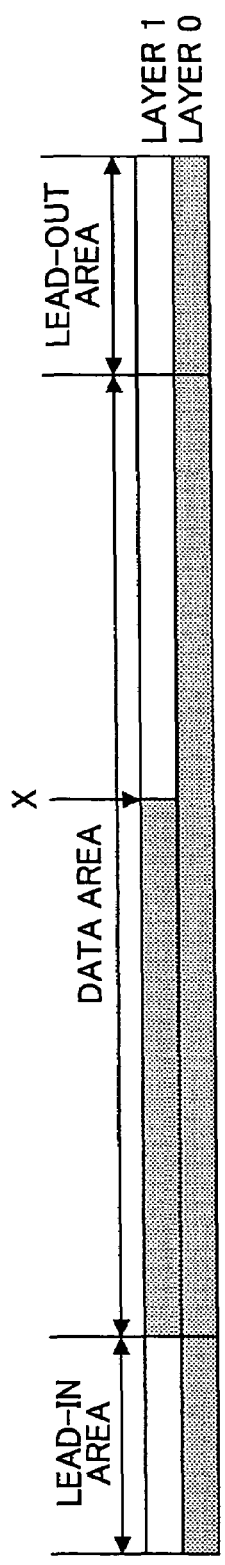
FIG. 3B is another descriptive diagram illustrating schematically the example process of handling the unrecorded area for the dual-layer DVD+R according to the PTP technique.
Figure 3C:
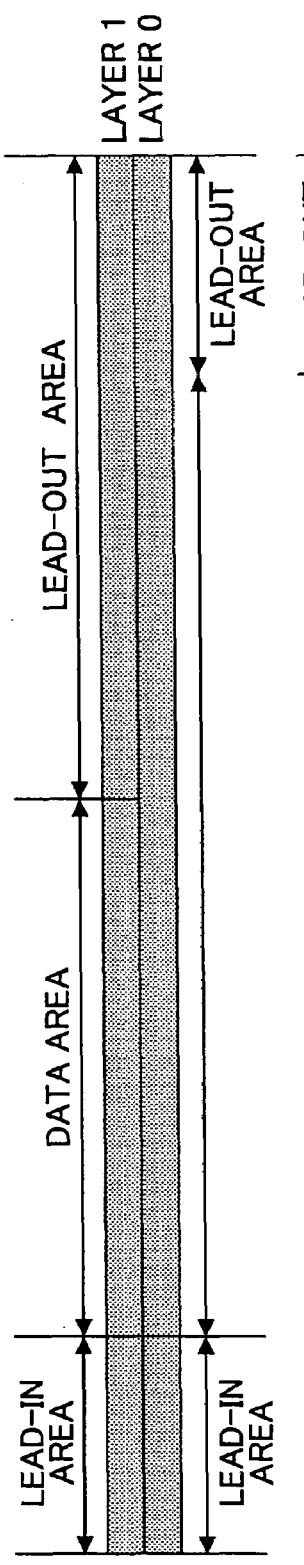
FIG. 3C is yet another descriptive diagram illustrating schematically the process of handling the unrecorded area for the dual-layer. DVD+R according to the PTP technique.
Figure 3D:
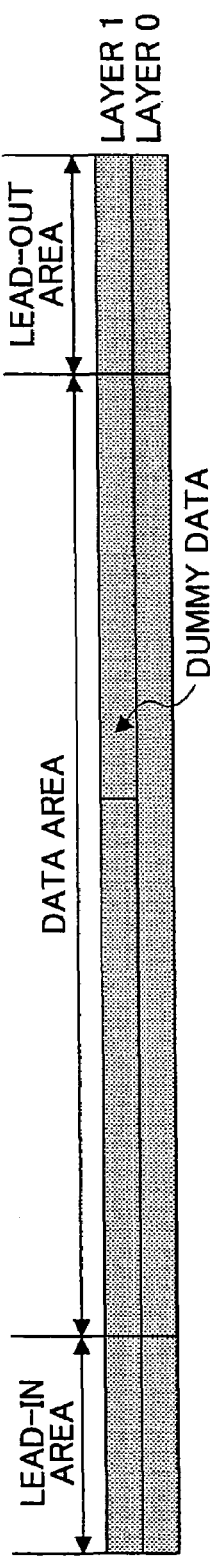
FIG. 3D is yet another descriptive diagram further illustrating schematically the process of handling the unrecorded area for the dual-layer DVD+R according to the PTP technique.

FIG. 3B through 3D illustrate an example process of handling when the user data recording is completed in the middle of the layer 1. FIG. 3B illustrates that the user data recording has been completed at the position of address X of the second layer (layer 1).

Thus, when the user data recording is completed in the middle, in one example process of handling, as illustrated in FIG. 3C, an unrecorded area at and after the user data recording area is recorded with the lead-out. In other words, the area from address X to address D of the layer 1 is recorded as a predetermined unrecorded area with predetermined data of the lead-out. Therefore, while for the layer 0, the lead-in area is from address A to B, the data area is from address B to C, and the lead-out area is from address C to D, for the layer 1, the lead-in area is from address A to B, the data area is from address B to X, and the lead-out area is from address X to D. As a result, the disk layout is the same as that for the single-side dual-layer playback-only DVD-ROM, enabling a maintaining of compatibility with the single-side dual-layer playback-only DVD-ROM without any problem even when the user data recording has been completed in the middle of the data area of the second layer (layer 1).

Moreover, when the user data recording is completed in the middle, in another example process of handling, as illustrated in FIG. 3D, to the area excluding the user-data recording area having recorded the user data out of the second recording layer (layer 1) data area, dummy data having a data attribute, for instance, all zeroes, are recorded. Herein, the lead-out may be recorded to the lead-out area (address C to D) of the layer 1. Therefore, for both layers 0 and 1, address A to B would be the lead-in area, address B to C would be the data area, and address C to D would be the lead-out area. As a result, the disk layout would be the same as the single-side dual-layer playback-only DVD-ROM, enabling a maintaining of compatibility with the single-side dual-layer playback-only DVD-ROM without any problem even when the user data recording is completed in the middle of the data area of the second layer (layer 1).

Next, an example process of handling for a dual-layer DVD+R according to an OTP technique, for instance, complying with the playback-only DVD disk layout is described with reference to FIGS. 4A through 4D.

Figure 4A:
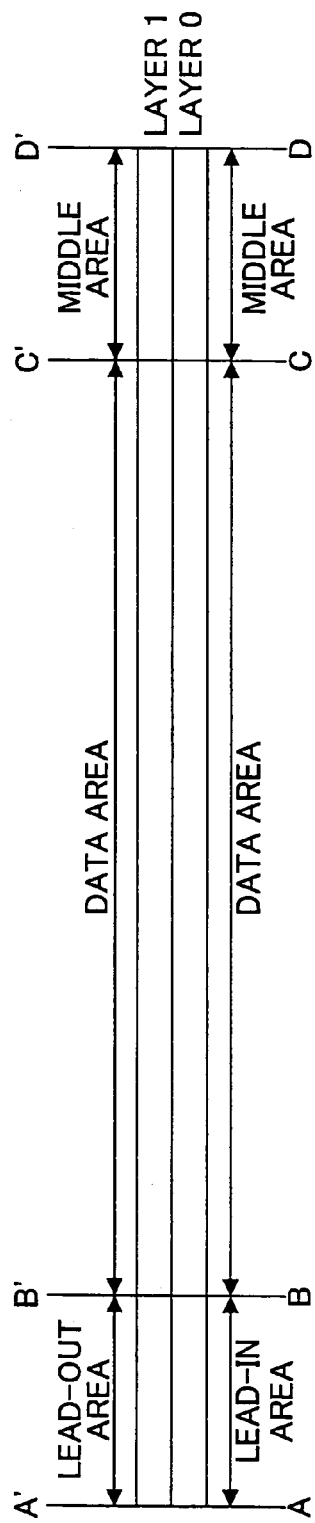
FIG. 4A is a descriptive diagram schematically illustrating a process of handling an unrecorded area for a dual-layer DVD+R according to OTP technique.

First, FIG. 4A illustrates a layout of a dual-layer DVD+R in an unrecorded state without recording at all. In layer 0 as a first recording layer exist from the inner radius of the disk a lead-in area, a data area, and a middle area; and in layer 1 a middle area, a data area, and a lead-out area exist from the outer radius of the disk. In FIG. 4A, A is the start address of the lead-in area, B is the start address of the data area of the layer 0, C is the start address of the middle area of the layer 0, and D is the end address of the middle area of the layer 0. Moreover, in FIG. 4A, D' illustrates the position of the start address of the middle area of the layer 1, C' illustrates the position of the start address of the data area of the layer 1, B' illustrates the position of the start address of the lead-out area, and A' illustrates the position of the position of the end address of the lead-out area, and the values of the pairs A and A', B and B', C and C', D and D' are such that for each pair, one of the addresses has bits which are inverted from the other address, the pairs being positioned in the identical radial positions of the optical disk 2.

Figure 4B:
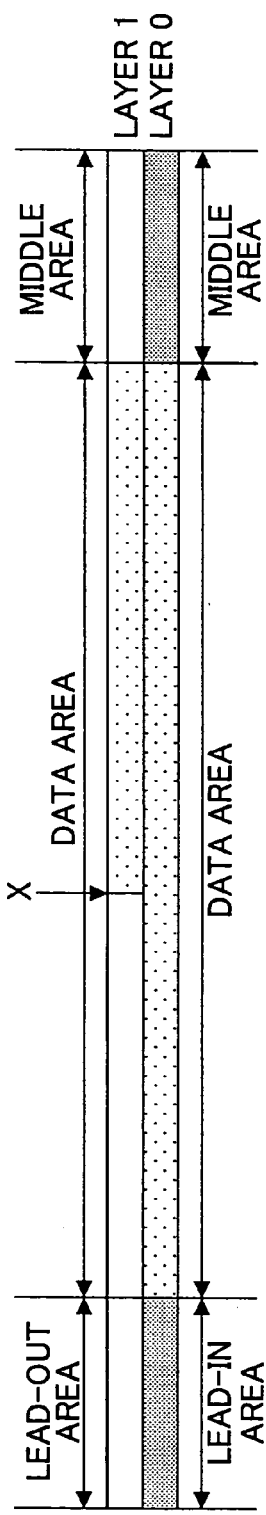
FIG. 4B is another descriptive diagram illustrating schematically the process of handling the unrecorded area for the dual-layer DVD+R according to the OTP technique.
Figure 4C:
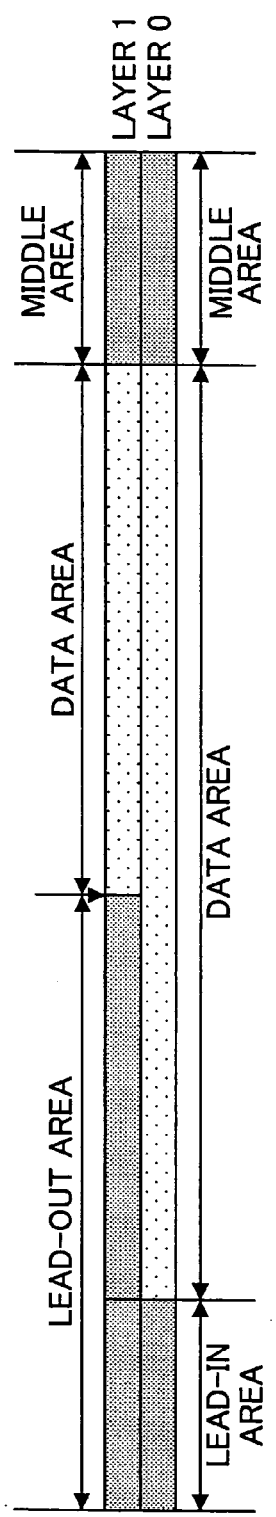
FIG. 4C is yet another descriptive diagram illustrating schematically the process of handling the unrecorded area for the dual-layer DVD+R according to the OTP technique.
Figure 4D:
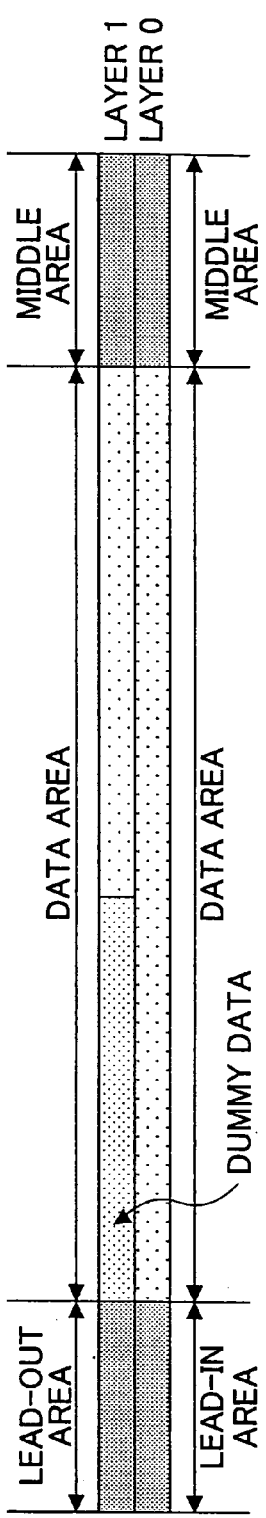
FIG. 4D is yet another descriptive diagram further illustrating schematically the process of handling the unrecorded area for the dual-layer DVD+R according to the OTP technique.

FIGS. 4B through 4D illustrate an example process of handling when the user data recording has been completed in the middle of the layer 1. FIG. 4B illustrates the fact that the user data recording has been completed at the position of address X of the second layer (layer 1).

Thus, when the user data recording is completed in the middle, as illustrated in FIG. 4C, the unrecorded area at and after the user data recording area is recorded with the lead-out. In other words, the area from the address X to the address A' is recorded as a predetermined unrecorded area with predetermined data of the lead-out. Therefore, address A to B would be the lead-in area, address B to C would be the data area of the layer 0, address C to D would be the middle area of the layer 0, address D' to C' would be the middle area of the layer 1, address C' to X would be the data area of the layer 1, and the address X to A' would be the lead-out area. As a result, the disk layout would be the same as the single-side dual-layer playback-only DVD-ROM, enabling a maintaining of compatibility with the single-side dual-layer playback-only DVD-ROM without any problem even when the user data recording is completed in the middle of the data area of the second layer (layer 1).

Moreover, when the user data recording is completed in the middle, with another example process of handling, as illustrated in FIG. 4D, dummy data having a data attribute, for instance all zero data, are recorded for the area excluding the user data recording area having the user data recorded out of the data area of the second recording layer (layer 1). In other words, the area from address X to address B' is recorded as a predetermined unrecorded area with predetermined data of dummy data having a predetermined data attribute. Herein, the lead-out may be recorded for the lead-out area (from address B' to A'). Therefore, address A to B would be the lead-in area, address B to C would be the data area of the layer 0, address C to D would be the middle area of the layer 0, address D' to C' would be the middle area of the layer 1, address C' to B' would be the data area of the layer 1, and address B' to A'would be the lead-out area. As a result, the disk layout would be the same as for a single-side dual-layer playback-only DVD-ROM, enabling a maintaining of compatibility with the single-side dual-layer playback-only DVD-ROM even when the user data recording has been completed in the middle of the data area of the second layer (layer 1).

As these example processes of handling indicate, it would be possible to resolve problems due to an unrecorded area remaining even when the user data recording has been completed in the middle of the data area by having to record the unrecorded area existing within the data area with predetermined data, such as predetermined data of, for instance, the lead-out or dummy data having a data attribute, etc., although when the user data recording is terminated at a state in which data area of the second recording layer (layer 1) is unrecorded, or the data recording is completed without having any user data recorded to the second recording layer (layer 1), a need arises to have the unrecorded area existing in the data area of the second recording layer (layer 1) fully occupied with these predetermined data, leading to a problem such as having to require a long time period for the process of occupying the unrecorded areas.

In such a case, if all of the sizes (amounts) of the data for the user to record are known in advance, dividing the user data so that, for instance, the respective data sizes to be recorded on the first recording layer (layer 0) and to be recorded on the second recording layer (layer 1) for recording are almost equal, rather than using the whole area of the data area of the first recording layer (layer 0) for recording data, practically eliminates the unrecorded area, enabling a reducing of the time required for occupying the unrecorded area with the predetermined data, although simply dividing the data is difficult to implement for the following reasons.

Namely, as described above, in the DVD+R, physical addresses are assigned for the whole area of the initial-data area preset so that logical addresses are uniquely determined for the area designated by the physical addresses. Moreover, the logical addresses are continuous from the end address of the data area in the first recording layer (layer 0) to the start address of the data area of the second recording layer (layer 1). Furthermore, the user recording data includes management data for managing the recording data, the management data being managed using the logical addresses as address information having recorded the user data entities. Therefore, simply dividing the user recording data at a random size so as to record on these multiple recording layers would lead to inconsistencies between the address information with the management data and the actually-recorded address information. In order to avoid these problems, while it is necessary to maintain a continuity of the logical addresses by having to modify the area to be actually used for data recording out of the initial-data area preset in the first recording layer (layer 0) as the data area, making the subsequent area as the lead-out area or the middle area, and to set the data area of the second recording layer (layer 1) as an area corresponding to the radial position identical to the data area of the first recording layer (layer 0), although at the present, such means for setting does not exist so that the present invention provides such means for setting.

In other words, the present embodiments make it possible to modify as the data area the area to be actually used for data recording within the extent of the initial-data area preset, the principle of one of the embodiments being described with reference to FIGS. 5A through 5F. This example is an example such that the desired data area is set based on the address designated by the host 21 within the extent of the initial-data area preset in the first recording layer (layer 0).

Figure 5A:
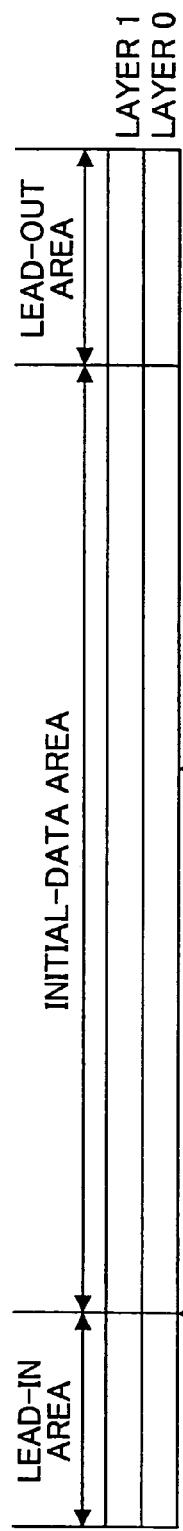
FIG. 5A is a schematic diagram illustrating a principle of an embodiment for modifying a data area.
Figure 5B:
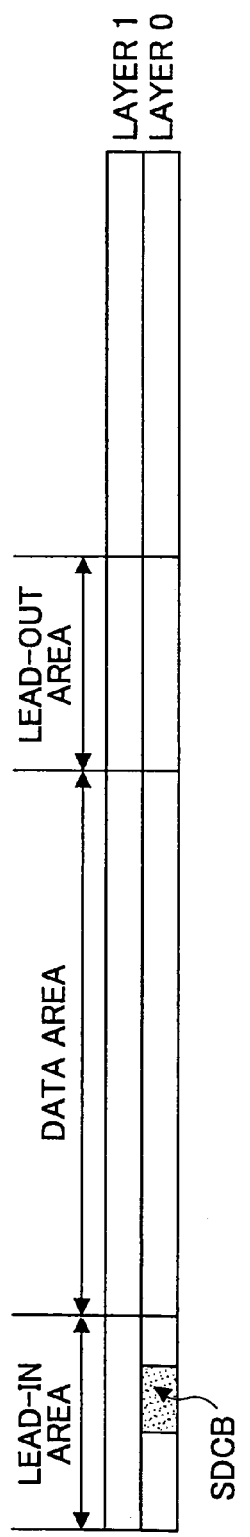
FIG. 5B is another schematic diagram illustrating the principle of the embodiment for modifying the data area.
Figure 5C:
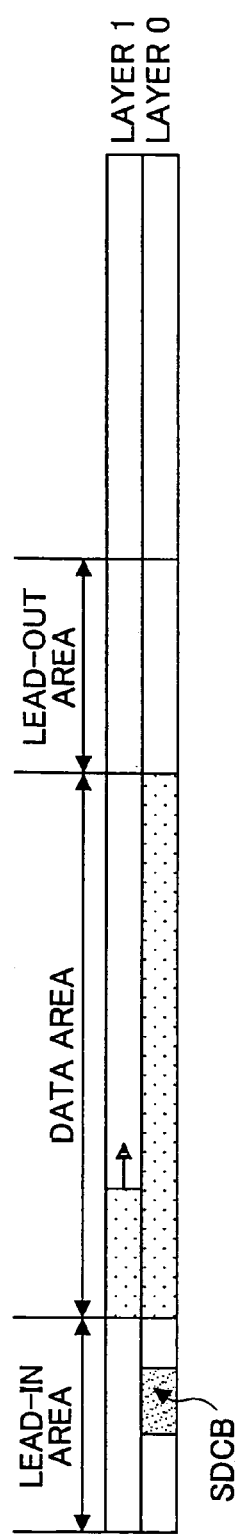
FIG. 5C is yet another schematic diagram illustrating the principle of the embodiment for modifying the data area.

FIGS. 5A through 5C illustrate an example of recording in a dual-layer DVD+R according to the PTP technique. FIG. 5A is a layout of the dual-layer DVD+R at an unrecorded state. In other words, in each of recording layer 0 and recording layer 1 exists a lead-in area, an initial-data area, and a lead-out area.

In such an unrecorded state, as illustrated in FIG. 5A, it is assumed that an end address B of the data area of the first recording layer (layer 0) is designated from the host 21 to the optical-disk apparatus 1 (designating means for modifying of data area) (A being the start address). Herein, as illustrated in FIG. 5B, the optical-disk apparatus 1 based on such address designation sets as the data area address A to B of the layer 0 and the layer 1, as the lead-out area a predetermined area following the address B, and then records information regarding these areas as described above in a SDCB (Session Disk Control Block) area within the lead-in area (the SDCB area to be described below.).

In other words, determining a modifying of the data area of the layer 0 as the reference leads to determining the extent of the data area of the layer 1. Moreover, the logical addresses are assigned for address A to B of the layer 0 and address A to B of the layer 1, the address B of the layer 0 and the address A of the layer 1 being continuous logical addresses.

Next, as illustrated in FIG. 5C, when a request for recording of user data is received from the host 21, the user data are recorded from the address A of the layer 0 and at the time the recording is completed up to the address B, the recording continues from the address A of the layer 1. In other words, recording data of the desired sizes on the respective recording layers (layers 0 and 1) while maintaining continuity in the logical addresses is enabled.

It is to be noted that in the present embodiment, FIG. 5C illustrates an open-session state. Therefore, when finally the user data recording is completely terminated and the compatibility with the playback-only dual-layer DVD disk is sought, if there is an unrecorded area in layer 1, predetermined data such as the lead-out and the dummy data, etc., may be recorded in the unrecorded area in accordance with the example process of handling as described with reference to FIGS. 3A through 3D, and finally the lead-out may be recorded so as to make a closed session. Even when the process of providing data for such an unrecorded area is needed, for the layer 0 the size of the initial-data area is not kept but modified to the size of a desired data area so that the size of the resultant data area is smaller, enabling a reducing of the processing time period. Moreover, modifying of the data area having received such address designation enables a simple realizing of recording in a data format completely identical to the playback-only DVD to be produced (a format in accordance with the size of the first layer of the original disk).

Figure 5D:
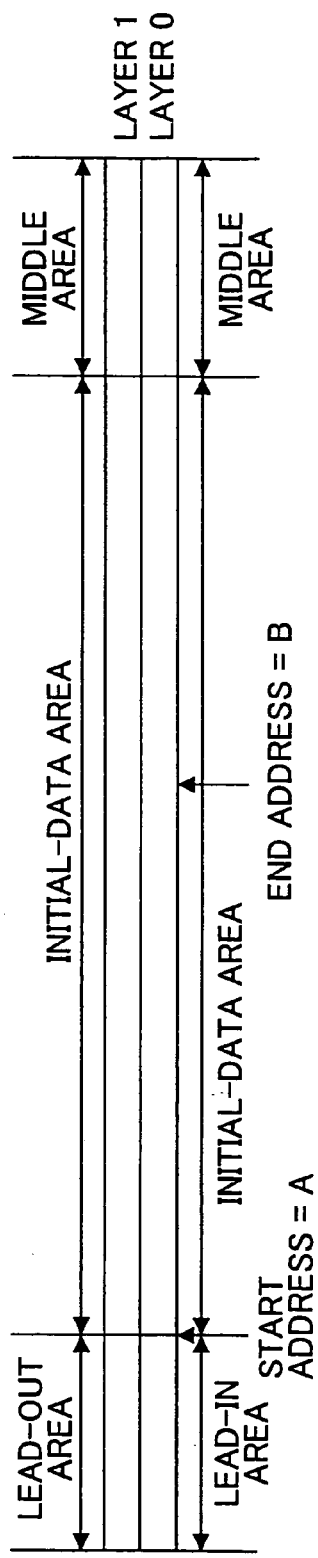
FIG. 5D is yet another schematic diagram illustrating the principle of the embodiment for modifying the data area.
Figure 5E:
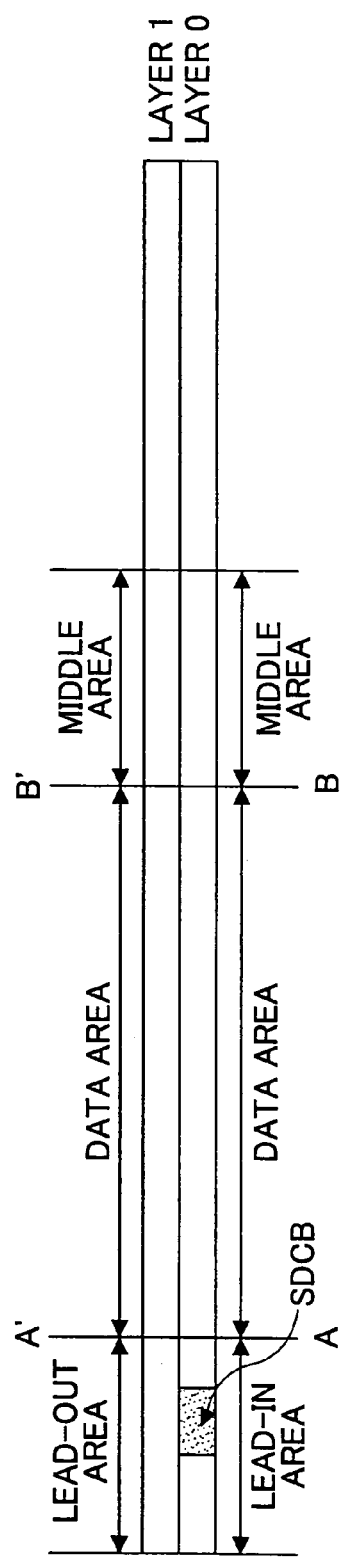
FIG. 5E is yet another schematic diagram illustrating the principle of the embodiment for modifying the data area.
Figure 5F:
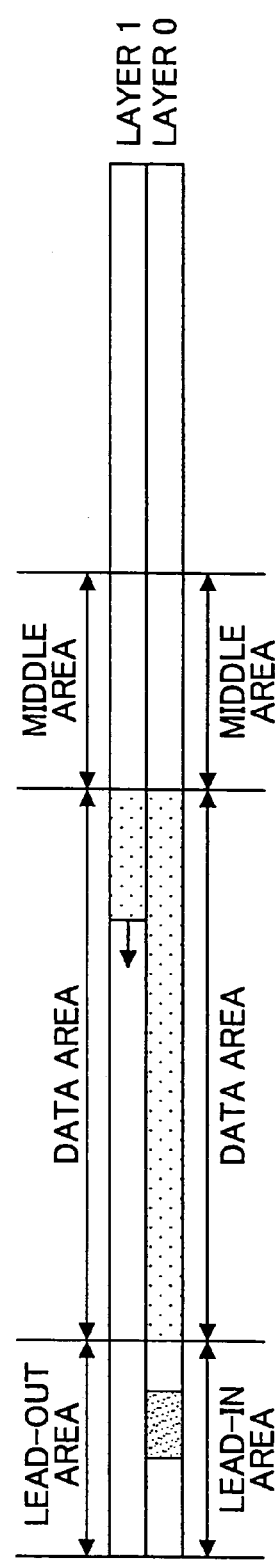
FIG. 5F is yet another schematic diagram illustrating the principle of the embodiment for modifying the data area.

FIGS. 5D through 5F illustrate an example recording into a dual-layer DVD+R according to the OTP technique. FIG. 5D illustrates a layout of a dual-layer DVD+R in an unrecorded state. In other words, in the layer 0, from the inner radius of the disk, a lead-in area, an initial-data area, and a middle area exist, and in the layer 1, from the outer radius of the disk, a middle area, an initial-data area, and a lead-out area exist.

In such an unrecorded state, as illustrated in FIG. 5D, it is assumed that an end address B of the data area of the first recording layer (layer 0) is designated from the host 21 to the optical-disk apparatus 1 (means of designating modifying data area). Herein, as illustrated in FIG. 5E, the optical-disk apparatus 1 upon receiving such address designation, modifies address A to B as the data area of the layer 0, a predetermined area following address B as the middle area of the layer 0, a predetermined area following address B' (in the direction of the outer radius) as the middle area of the layer 1, and address B' to address A' as the data area of the layer 1, and then records information regarding the data area on the SDCB area of the lead-in area. Herein, the values of the pairs A and A', B and B' are such that for each pair, one of the addresses has bits which are inverted from the other address, the pairs being positioned in the identical radial positions. In other words, determining the data area of the layer 0 to be the reference leads to determining the size of the data area of the layer 1. Moreover, the logical addresses are assigned for address A to B of the layer 0 and address B' to A' of the layer 1, the logical addresses for the address B of the layer 0 and the address B' of the layer 1 being continuous.

Next, as illustrated in FIG. 5F, when a request by the host 21 for recording of the user data is received, recording is performed from address A of the layer 0, and when the recording has been completed up to address B, the recording continues from address B' of the layer 1. In other words, recording data of the desired size in the respective recording layers (layer 0, 1) while maintaining continuity of the logical addresses is enabled. Again the same advantages as in the case of FIGS. 5A through 5C are obtained.

Next, the principle of another embodiment is described with reference to FIGS. 6A to 6F. This example is an example such that a setting is performed based on a size designation of the desired data area from the host 21 within the extent of the initial-data area preset in the first recording layer (layer 0). It is to be noted that in the present embodiment the modifying of the data area is done for only the size designated from the start address of the data area.

Figure 6A:
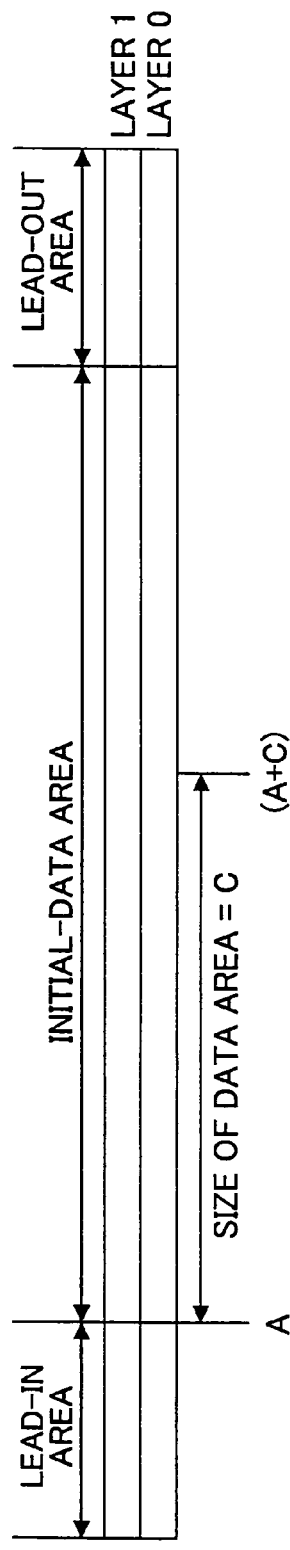
FIG. 6A is a schematic diagram illustrating a principle of another embodiment for modifying the data area.
Figure 6B:
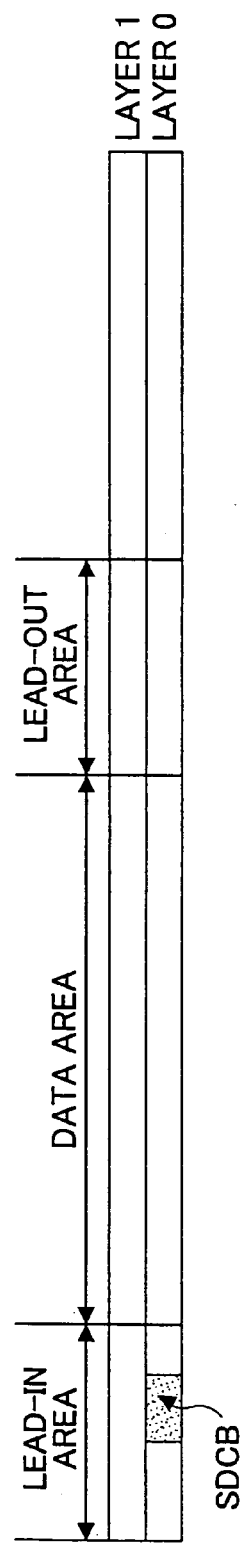
FIG. 6B is another schematic diagram illustrating the principle of the other embodiment for modifying the data area.
Figure 6C:
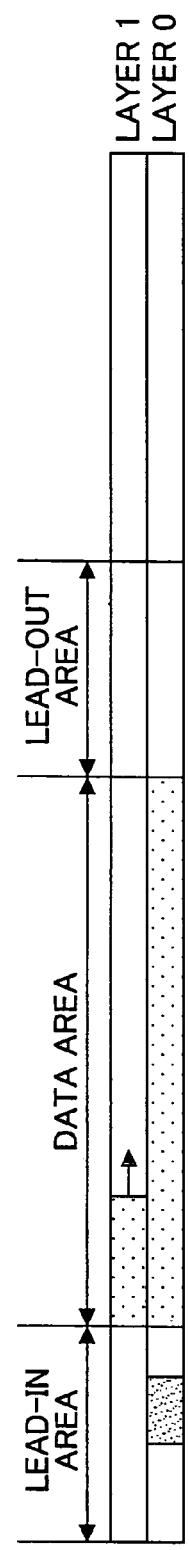
FIG. 6C is yet another schematic diagram illustrating the principle of the other embodiment for modifying the data area.

FIGS. 6A to 6C illustrate an example recording into a dual-layer DVD+R according to the PTP technique. As illustrated in FIG. 6A, it is assumed that size C of the data area of the layer 0 is designated from the host 21 (means for designating modifying of data area). Herein, as illustrated in FIG. 6B, the optical-disk apparatus 1 sets address A (A being the start address of the data area) to (A+C) of the layers 0 and 1 as the data area, and a predetermined area at and following address (A+C) as the lead-out area, and then information regarding these areas is recorded in the SDCB area within the lead-in area. In other words, determining the data area of the layer 0 determines the size of the data area of the layer 1. Moreover, the logical addresses are assigned for address A to (A+C) of the layer 0 and address A to (A+C) of the layer 1, the logical addresses for the address (A+C) of the layer 0 and the address A of the layer 1 being continuous.

Next, as illustrated in FIG. 6C, when a request for recording of user data is received from the host 21, a recording is performed from address A of the layer 0, and when the recording is completed up to the address (A+C), the recording continues from the address A of the layer 1. In other words, recording of data of the desired size in the respective recording layers (layers 0 and 1) while maintaining continuity of the logical addresses is enabled. Again the same advantages as in the case of FIGS. 5A through 5C are obtained.

Figure 6D:
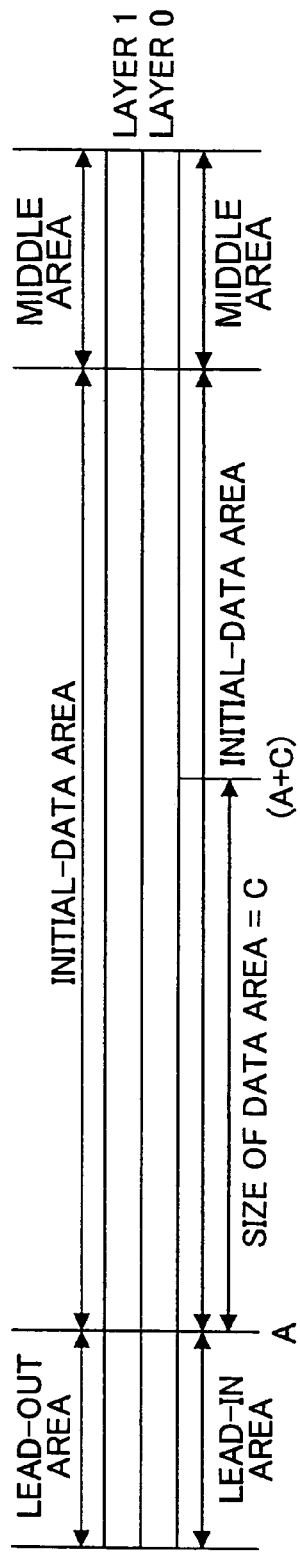
FIG. 6D is yet another schematic diagram illustrating the principle of the other embodiment for modifying the data area.
Figure 6E:
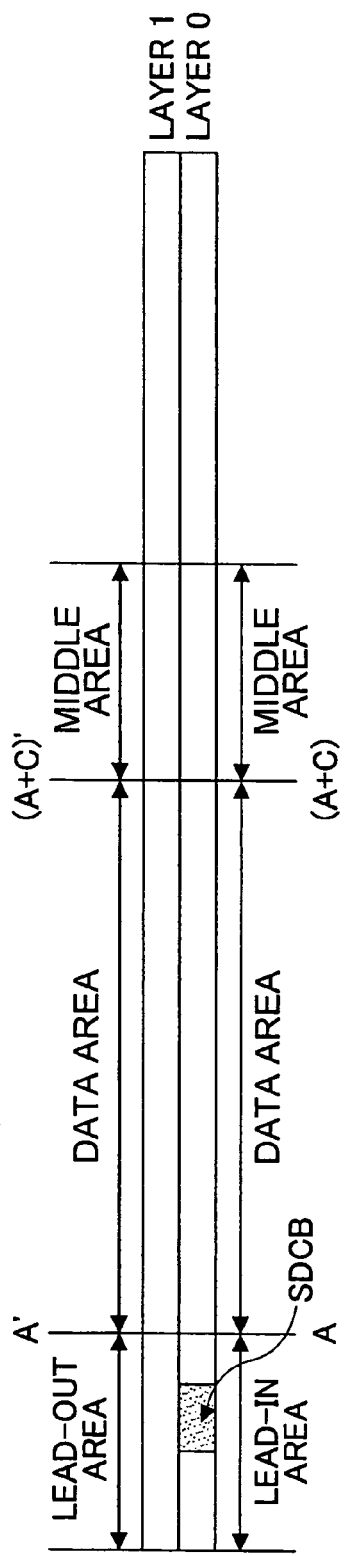
FIG. 6E is yet another schematic diagram illustrating the principle of the other embodiment for modifying the data area.
Figure 6F:
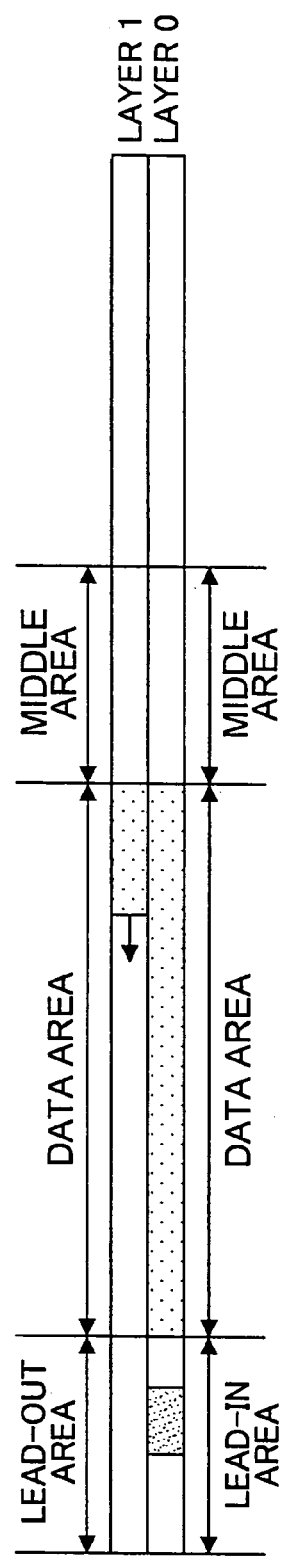
FIG. 6F is yet another schematic diagram illustrating the principle of the other embodiment for modifying the data area.

FIGS. 6D through 6F illustrate an example recording to a dual-layer DVD+R according to the OTP method. In an unrecorded state, as illustrated in FIG. 6D, it is assumed that a size C of the data area of the first recording layer (layer 0) is designated from the host 21 (designating means of modifying of data area). Herein, as illustrated in FIG. 6E, the optical-disk apparatus 1 sets address A (A being the start address of the data area) to (A+C) as the data area of the layer 0, a predetermined area at and following (A+C) as the middle area of the layer 0, a predetermined area at and following (A+C)' as the middle area of the layer 1, and (A+C)' to A' as the data area of the layer 1, and then information regarding these areas is recorded in the SDCB area within the lead-in area. Herein, the values of the pairs A and A', (A+C) and (A+C)' are such that, for each pair, one of the addresses has bits which are inverted from the other address, the pairs being positioned in the identical radial positions. In other words, determining the data area of the layer 0 as the reference determines the size of the data area of the layer 1. Moreover, the logical addresses are assigned for address A to (A+C) of the layer 0 and address (A+C)' to A' of the layer 1, the logical addresses for the address (A+C) of the layer 0 and the address (A+C)' of the layer 1 being continuous.

Next, as illustrated in FIG. 6F, when a request for recording of user data is received from the host 21, a recording is performed from the address A of the layer 0 and when the recording is completed up to the address (A+C), the recording continues from the address (A+C)' of the layer 1. In other words, recording data of the desired size in the respective recording layers (layer 0 and 1) while maintaining continuity of the logical addresses is enabled. Again the same advantages as in the case of FIGS. 5A through 5C are obtained.

Moreover, the principle of yet another embodiment is described with reference to FIGS. 7A through 7F. This example is an example application to a case of modifying as the data area the recorded area out of the initial-data area preset in the first recording layer (layer 0). It is to be noted that, herein, setting as the data area the area recorded by the time of receiving a designation of completion notification of recording data in the first recording layer (layer 0) from the host 21 is assumed.

Figure 7A:
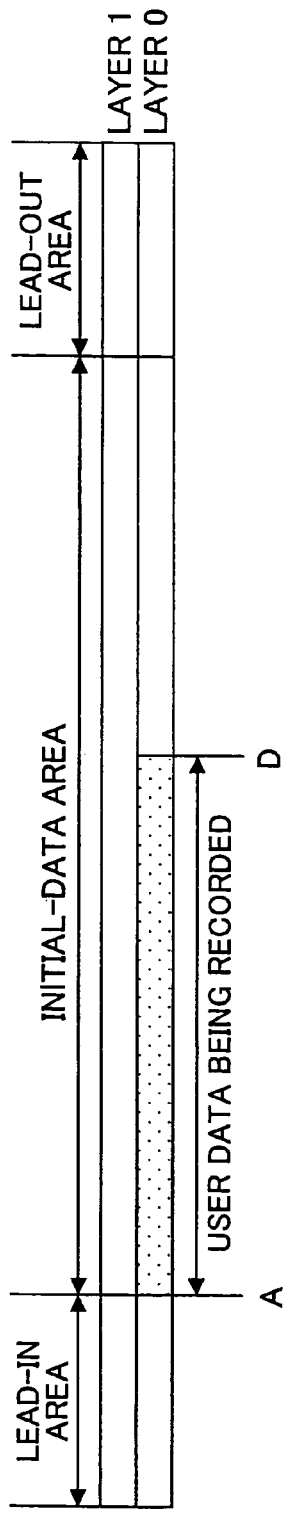
FIG. 7A is a schematic diagram illustrating the principle of yet another embodiment for modifying the data area.
Figure 7B:
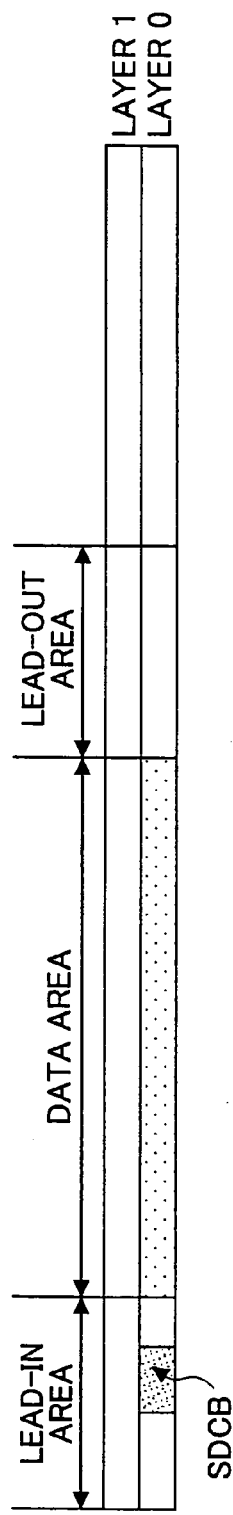
FIG. 7B is another schematic diagram illustrating the principle of the yet another embodiment for modifying the data area.
Figure 7C:
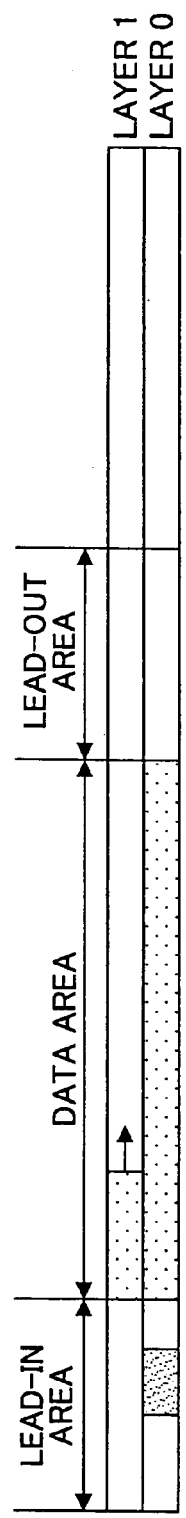
FIG. 7C is yet another schematic diagram illustrating the principle of the yet another embodiment for modifying the data area.

FIGS. 7A through 7C illustrate an example recording in a dual-layer DVD+R according to the PTP technique. In FIG. 7A, it is assumed that a notification of completing recording in the first recording layer (layer 0) from the host 21 is received (designating means for modifying of data area). Herein, as illustrated in FIG. 7B, the optical-disk apparatus 1 sets address A to D of the layers 0 and 1 as the data area, and a predetermined area at and following the address D as the lead-out area, and then information regarding these areas is recorded in the SDCB area within the lead-in area.

In other words, determining a modifying of the data area of the layer 0 as the reference determines the size of the data area of the layer 1. Moreover, the logical addresses are assigned for address A to D of the layer 0, and address A to D of the layer 1, the logical addresses for the address D of the layer 0 and the address A of the layer 1 being continuous.

Next, as illustrated in FIG. 7C, when a request for recording of user data is received from the host 21 continually, a recording is performed continuously from the address A of the layer 1. In other words, recording of data of the desired size on the respective recording layers (layers 0 and 1) while maintaining continuity of the logical addresses is enabled. Again the same advantages as in the case of FIG. 5A through 5C are obtained.

Figure 7D:
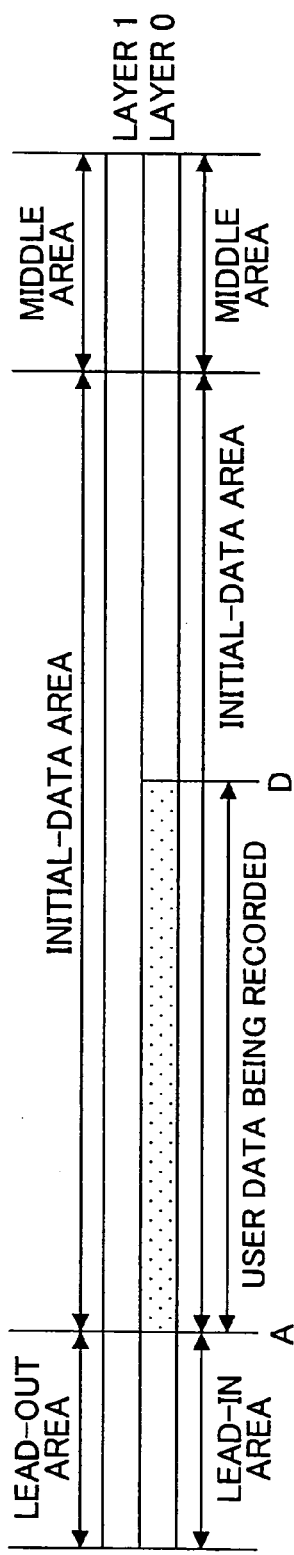
FIG. 7D is yet another schematic diagram illustrating the principle of the yet another embodiment for modifying the data area.
Figure 7E:
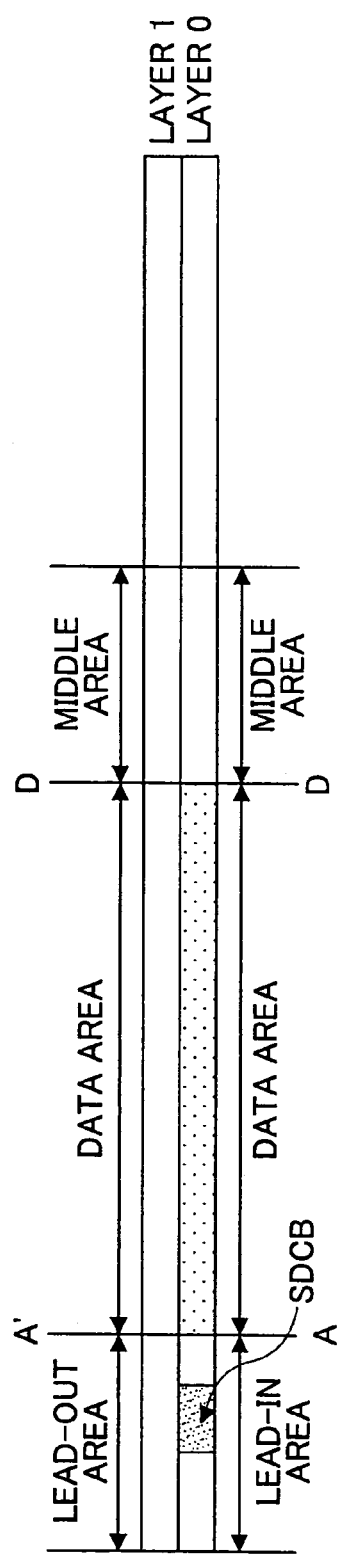
FIG. 7E is yet another schematic diagram illustrating the principle of the yet another embodiment for modifying the data area.
Figure 7F:
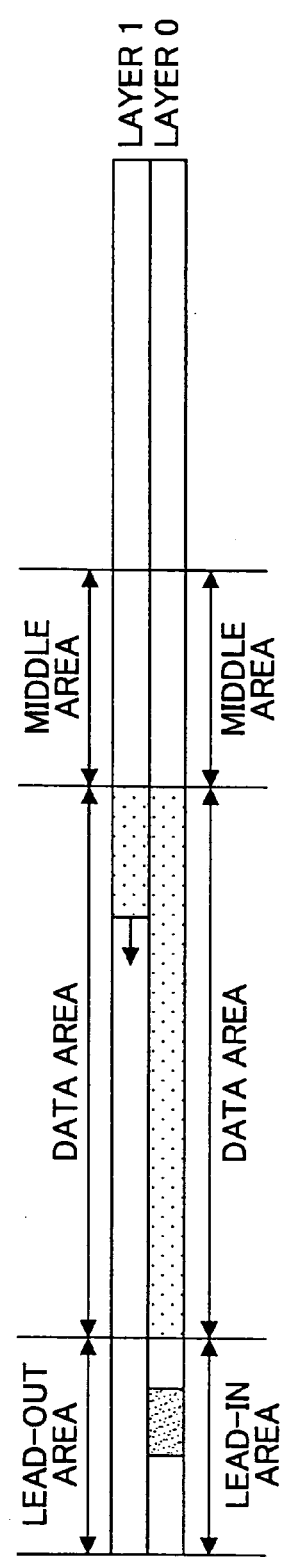
FIG. 7F is yet another schematic diagram illustrating the principle of the yet another embodiment for modifying the data area.

FIGS. 7D through 7F illustrate an example recording in a dual-layer DVD+R according to the OTP technique. In FIG. 7D, it is assumed that a notification of completion of recording in the first recording layer (layer 0) is received from the host 21 (designating means for modifying of data area). Herein, as illustrated in FIG. 7E, the optical-disk apparatus 1 modifies A to D as the data area of the layer 0, a predetermined area at and following D as the middle area of the layer 0, a predetermined area at and following D' (in the direction of the outer radius) as the middle area of the layer 1, and D' to A' as the data area of the layer 1, and then records information regarding these areas in the SDCB area within the lead-in area. Herein, the values of the pairs A and A', and D and D' are such that, for each pair, one of the addresses has bits which are inverted from the other address, the pairs being positioned in the identical radial positions.

In other words, determining a modifying of the data area of the layer 0 determines the size of the data area of the layer 1. Moreover, the logical addresses are assigned for address A to D of the layer 0, and address D' to A' of the layer 1, the logical addresses for the address D of the layer 0 and the address D' of the layer 1 being continuous.

Next, as illustrated in FIG. 7F, when a request for recording of user data is received from the host 21 continually, a recording is performed continuously from address D' of the layer 1. In other words, recording of data of the desired size in the respective recording layers (layers 0 and 1) while maintaining continuity of the logical addresses is enabled. Again the same advantages as in the case of FIG. 5A through 5C are obtained.

Now, the SDCB (Session Disk Control Block) being included in the lead-in area so that management information regarding data recording is recorded is described. In a DVD+R, a multi-track (called a fragment in the DVD+R) multi-session recording is being adopted, the fragment information within the respective sessions being recorded in the SDCB area within the session lead-in.

FIG. 8 illustrates an example format of such a SDCB. As illustrated in FIG. 8, the SDCB contains descriptions of a contents descriptor, an unknown contents descriptor action, a drive ID, a session number, etc., as well as multiple (zero through N) session items as SDCB-specific information, each session item consisting of 16 bytes.

Each session item further contains two types of items: a fragment item indicating information on fragments within the present session, and a previous session item indicating information on sessions previous to the present session.

FIG. 9 illustrates an example format of a fragment item. Within the format of the fragment item, fragment information items such as a fragment number, a fragment start address, a fragment end address, etc., are set so as to be described as management information. Such a fragment item is provided as one of the session items per fragment existing within the session.

FIG. 10 illustrates an example format of a previous session item. Within the format of the previous session item, session information items such as a previous session number, a previous session start address, and a previous session end address, etc., are set so as to be described as management information.

FIG. 11 illustrates an example storage of information regarding data areas according to the present embodiment. In the present embodiment, a layer item as illustrated in FIG. 11 has been newly added to a session item within a SDCB. Herein, a layer item descriptor is an ID for indicating that this recording information describes a layer item and is recorded as "LYR". A layer number indicates the layer number, a layer start address and a layer end address indicate the start address and the end address, respectively, of the data area within the respective layers 0 and 1 so that this address information is recorded even when having been modified as described above. Therefore, even if the optical disk 2 is ejected after setting the data area, there would be no problem in ejecting the optical disk 2 before completing the data recording as information regarding such data area is being recorded in the layer item within the SDCB at the time of modifying.

Figure 12:
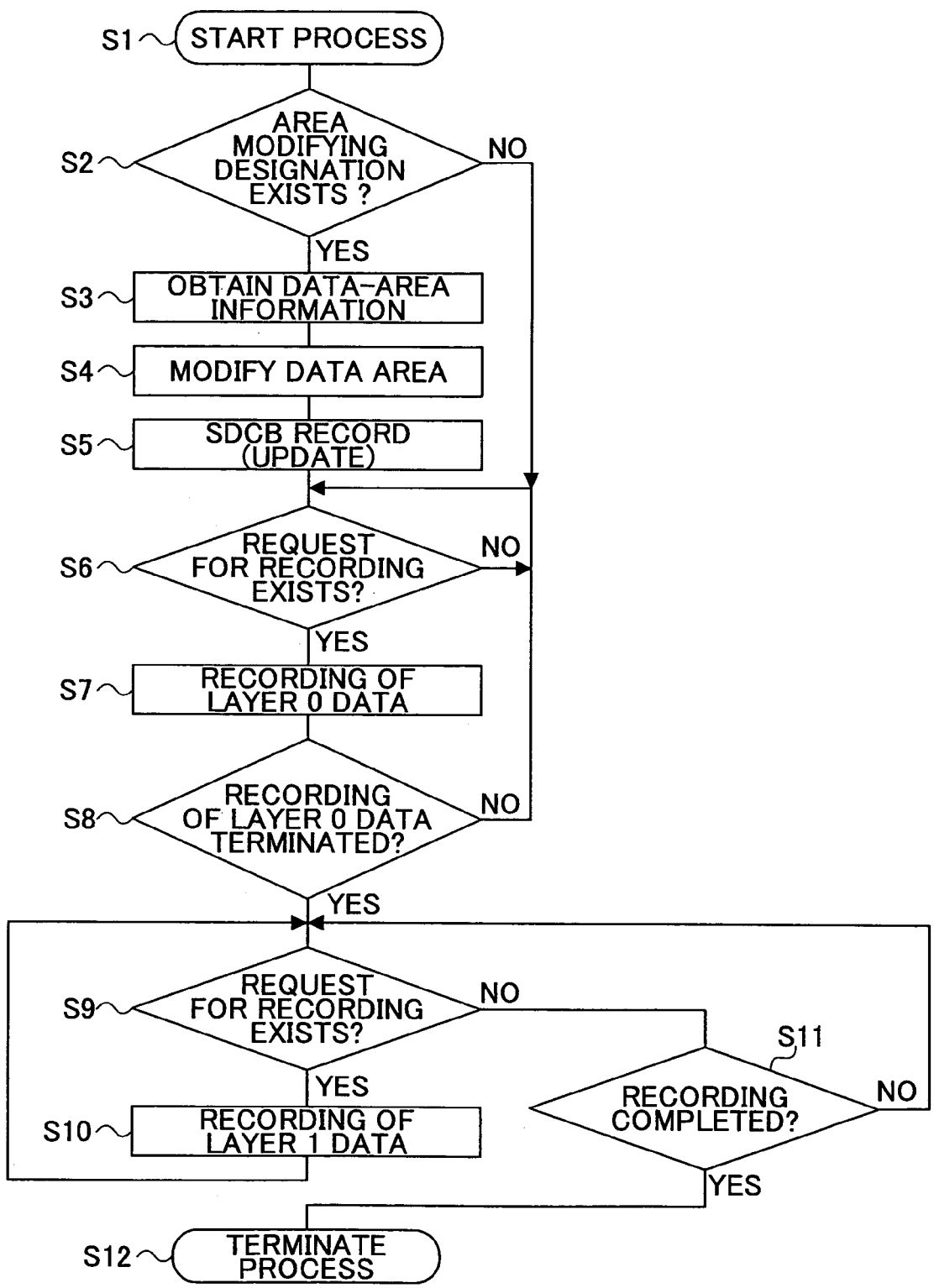
FIG. 12 is a schematic flowchart illustrating an example of control of a process of modifying the data area.

Now, an example control of the process performed by the CPU 13 regarding the modifying of the data area as illustrated in FIGS. 5A through 5F or in FIGS. 6A through 6F is described with reference to a schematic flowchart as illustrated in FIG. 12. This example assumes that a designating of modifying the data area is received from the host 21 so as to perform the modifying of that data area prior to an operation of recording user data.

Once the process starts (step S1), it is determined whether there exists a designating of modifying the data area regarding the first recording layer (layer 0) from the host 21 (S2). If it is affirmative (Y in S2), information regarding the extent of that data area (for example, address designation information and size designation information as described above) is obtained (S3), the data area is modified based on the designation information (S4), and then SDCB including information regarding the data area is recorded (updated) (S5).

In other words, the information obtained in the Step S3 process, is a data area end address in case of FIGS. 5A through 5F and a data area size in case of FIGS. 6A through 6F. Moreover, once information regarding the extent of the data area is obtained, the designated extent is set as the modified data area in the first recording layer (layer 0), and the lead-out area or the middle area is set following that data area. As a result, the extent of the data area in the second recording layer (layer 1) and the position of the lead-out area or the middle-area are determined.

Subsequently, the process waits for a request for recording of user data from the host 21 (S6), and once the request for the recording of the data is received (Y in S6), the requested user data are recorded in the data area of the layer 0 (S7). Next, the process determines whether recording in the whole area of the data area modified in Step S4 has been completed (S8), and if there remains an unrecorded data area in the layer 0 (N in S8), the process again waits for a request for recording of the user data from the host 21 (S6)

On the other hand, when there is no unrecorded area in the data area of the layer 0 (Y in S8), recording in the data area of the layer 1 is continued. Herein, the process waits for a request for recording from the host 21 (S9), and once the request for the recording of data is received (Y in S9), the requested data are recorded in the data area of the layer 1 (S10), and again the process waits for the request for recording of data from the host 21 (S9).

On the other hand, if there is no request for recording of data (N in S9), the process determines whether the request for recording from the host 21 is completed (S11). If the request for recording of data has not been completed (N in S11), the process again waits for the request for the recording of data (S9), but if the request for the recording of the data has been completed (Y in S11), the process is terminated (S12).

It is to be noted that in this example process, the recording timing, etc., of the lead-in area excluding the SDCB, the lead-out area, and the middle area is not taken into account specifically, so that the recording may be performed at a random timing.

Figure 13:
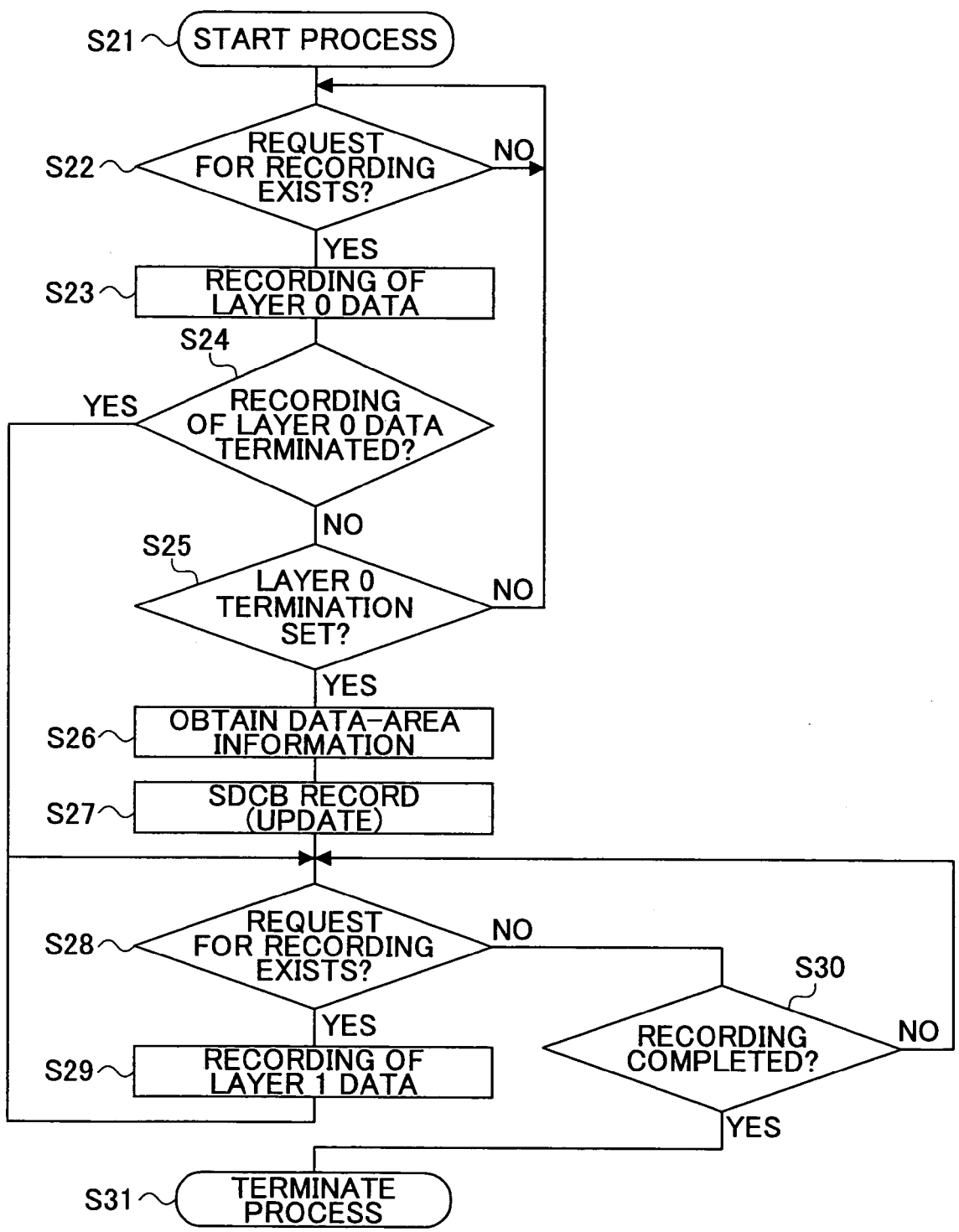
FIG. 13 is a schematic flowchart illustrating another example of control of the process of modifying the data area.

Moreover, an example control of the process performed by the CPU 13 regarding the modifying of the data area as illustrated in FIGS. 7A through 7F is described with reference to a schematic flowchart illustrated in FIG. 13. It is assumed that this example modifies as the data area, the recorded area out of the initial-data area preset at the time of the designation of the completion notification of recording of data in the first recording layer (layer 0) from the host 21 during the operation of recording in the first recording layer (layer 0).

Once the process is started (S21), the process waits for a request for recording of user data from the host 21 (S22), and upon receiving the request for recording of the user data (Y in S22), the requested data are recorded in the data area (the initial-data area) of the layer 0 (S23). Next, the process determines whether recording in the whole area of the data area of the layer 0 has been completed (S24), and if the recording in the layer 0 has been completed (Y in S24), the process transfers to the recording in the layer 1 continuously (S28).

On the other hand, if the recording in the layer 0 has not been completed (N in S24), the process determines whether the notification of completion of recording of the data in the first recording layer (the layer 0, herein) from the host 21 is received (S25), and if the notification of completion has been received (Y in S25), the data area of the layer 0 is modified (S26), and the SDCB containing information regarding this data area is recorded (S27).

In other words, the recorded area at the time of receiving the designation of completion notification in the layer 0 is modified as the data area, and the lead-out area or the middle area is set following that data area. As a result, the extent of the data area in the second recording layer (layer 1) and the position of the lead-out area or the middle area are determined.

On the other hand, if the notification of completion of recording of the data of the layer 0 has not been received (N in S25), again the process waits for a request for recording of data from the host 21 (S22).

Moreover, if the data area of the layer 0 is modified in Step S26, the process continues in which a recording in the data area of the layer 1 is performed. Herein, the process waits for a request for recording from the user from the host 21 (S28), and upon receiving the request for recording of the data (Y in S28), the requested data is recorded in the data area of the layer 1 (S29), and the process again waits for a request for recording of data from the host 21 (S28).

On the other hand, if there is no request for recording of data (N in S28), the process determines whether the request for recording from the host 21 has been completed (S30). If the request for recording of the data has not been completed (N in S30), again the process waits for the request for recording of data from the host 21 (S28) and if the request for recording of the data has been completed (Y in S30), the process is terminated (S31).

It is to be noted that in this embodiment again the recording timing, etc., of the lead-in area excluding SDCB, the lead-out area, and the middle area has not been taken into account specifically so that the recording may be performed at a random timing.

It is to be noted that, while a case in which the second recording layer is a single layer is described in the above, it may be equally applicable even in a case in which the second recording layer consists of multiple layers.

Moreover, while an example application to a case in which an information-recording medium is a dual-layer DVD+R is described in the present embodiment, the present invention may be applicable not only to the dual-layer DVD+R but also equally applicable to an information-recording medium having multiple recording layers, each layer having a data area for recording user data, and having a first recording layer to be a reference for determining the position of the data area in the recording layers, and a second recording layer exclusive of this first recording layer. Moreover, it is applicable not only to the +R format, but also to the +RW format, −R/RW formats, etc.

Furthermore, while an example system configuration, including the optical-disk apparatus 1 (an information-recording apparatus) and the host 22 (an information-processing apparatus), is described in this embodiment, it may also be equally applicable to a recorder-type information-processing apparatus provided inside the information-recording apparatus.

The present application is based on the Japanese Priority Application No. 2003-336920 filed on Sep. 29, 2003, the entire contents of which are hereby incorporated by reference.

What is claimed is:

1. An apparatus for processing information, which requests for recording of user data into an information-recording apparatus for recording into an information-recording medium, having a plurality of recording layers, each of the layers having a data area for recording the user data, having a first recording layer to be a reference for determining a position of said data area in each of said recording layers, and a second recording layer excluding the first recording layer, comprising:

designating means for modifying the data area configured to make a designation to said information-recording apparatus regarding size of the data area for said first recording layer within an extent of an initial-data area preset for said information-recording medium such that the data area to be used for the recording of the user data is allocated to said first recording layer and to said second recording layer.

2. The apparatus for processing information as claimed in claim 1, wherein said designating means for modifying the data area is configured to make the designation such that the data area to be used for the recording of the user data is allocated so that the data size for recording on the first recording layer is greater than or equal to the data size for recording on the second recording layer.

3. The apparatus for processing information as claimed in claim 1, wherein said designating means for modifying the data area is configured to designate, as the designation regarding the size of the data area, an end address of the data area within the extent of the initial-data area of said first recording layer.

4. The apparatus for processing information as claimed in claim 1, wherein said designating means for modifying the data area is configured to designate, as the designation regarding the size of the data area, a size of the data area to be used for the recording of the user data within the extent of the initial-data area of said first recording layer.

5. The apparatus for processing information as claimed in claim 1, wherein said designating means for modifying the data area is configured to designate, as the designation regarding the size of the data area, a notification of a completion of the recording on the first recording layer during the recording of the user data for the first recording layer within the extent of the initial-data area of said first recording layer.

6. An apparatus for recording information which makes a recording based on a request from an information-processing apparatus for recording of user data in an information-recording medium having a plurality of recording layers, each of the layers having a data area for recording the user data, and having a first recording layer to be a reference for determining a position of said data area in each of said recording layers, and a second recording layer excluding the first recording layer, comprising:

means for modifying the data area configured to make a setting regarding the size of the data area for said first recording layer within an extent of an initial-data area preset for said information-recording medium upon receiving a designation of modifying the data area from said information-processing apparatus.

7. The apparatus for recording information as claimed in claim 6, wherein said information-recording medium is an information-recording medium to be recorded according to a Parallel Track Path (PTP) technique, and said means for modifying the data area is configured to set a lead-out area following the data area to be set.

8. The apparatus for recording information as claimed in claim 6, wherein said information-recording medium is an information-recording medium to be recorded according to an Opposite Track Path (OTP) technique, and said means for modifying the data area is configured to set a middle area following the data area to be set.

9. The apparatus for recording information as claimed in claim 6, wherein said means for modifying the data area is configured to set, based on an address designation as the designation of modifying the data area, an end address of the data area of said first recording layer as the setting regarding the size of the data area.

10. The apparatus for recording information as claimed in claim 6, wherein said means for modifying the data area is configured to set, based on an area-size designation as the designation of modifying the data area, an area size of the data area of said first recording layer as the setting regarding the size of the data area.

11. The apparatus for recording information as claimed in claim 6, wherein said means for modifying the data area is configured to set, based on a designation with a notification of a completion of the recording on said first layer as the designation of modifying the data area, a size of a recorded area of said first recording layer as the setting regarding the size of the data area.

12. The apparatus for recording information as claimed in claim 6, further comprising:

record-processing means configured to make the recording of the user data for the data area of said second recording layer subsequent to the recording of the user data for the modified data area of said first recording layer.

13. The apparatus for recording information as claimed in claim 6, wherein said means for modifying data area is configured to record setting information regarding the size of the modified data area in a predetermined area of the information-recording medium.

14. The apparatus for recording information as claimed in claim 6, wherein said information-recording medium is a DVD+R standards-compliant information-recording medium.

15. The apparatus for recording information as claimed in claim 13, wherein said predetermined area for recording setting information regarding the size of the modified data area is a layer item within a SDCB (Session Disk Control Block).

16. A system for processing information, comprising:

an apparatus for processing information which requests for recording of user data into an information-recording apparatus for recording in an information-recording medium having a plurality of recording layers, each of the layers having a data area for recording the user data, and having a first recording layer to be a reference for determining a position of said data area in each of recording layers, and a second recording layer excluding the first recording layer, the apparatus for processing information including, designating means for modifying the data area configured to make a designation to said information-recording apparatus regarding the size of the data area for said first recording layer within an extent of an initial-data area preset for said information-recording medium such that the data area to be used for the recording of the user data is allocated to said first recording layer and to said second recording layer; and an apparatus for recording information which makes a recording based on a request from the information-processing apparatus for recording of user data in the information-recording medium having the plural recording layers, each of the layers having a data area for recording the user data, and having the first recording layer to be a reference for determining the position of said data area in said each of the recording layers, and the second recording layer excluding the first recording layer, the apparatus for recording information including, means for modifying the data area configured to make a setting regarding the size of the data area for said first recording layer within the extent of the initial-data area preset for said information-recording medium upon receiving a designation of modifying the data area from said information-processing apparatus.

17. A method of recording information for recording in an information-recording medium having a plurality of recording layers, each of the layers having a data area for recording the user data, and having a first recording layer to be a reference for determining a position of said data area in said each of the recording layers, and a second recording layer excluding the first recording layer, comprising:

the step of modifying the data area for making a setting regarding the size of the data area for said first recording layer within an extent of an initial-data area preset for said information-recording medium.

18. The method of recording information as claimed in claim 17, wherein said information-recording medium is an information-recording medium to be recorded according to a Parallel Track Path (PTP) technique, and said step of modifying the data area sets a lead-out area following the data area to be set.

19. The method of recording information as claimed in claim 17, wherein said information-recording medium is an information-recording medium to be recorded according to an Opposite Track Path (OTP) technique, and said step of modifying the data area sets a middle area following the data area to be set.

20. The method of recording information as claimed in claim 17, wherein said step of modifying the data area sets, based on an address designation as the designation of modifying the data area, an end address of the data area of said first recording layer as the setting regarding the size of the data area.

21. The method of recording information as claimed in claim 17, wherein said step of modifying the data area sets, based on an area-size designation as the designation of modifying the data area, an area size of the data area of said first recording layer as the setting regarding the size of the data area.

22. The method of recording information as claimed in claim 17, wherein said step of modifying the data area sets, based on a designation with a notification of a completion of the recording on said first layer as the designation of modifying the data area, a size of recorded area of said first recording layer as the setting regarding the size of the data area.

23. The method of recording information as claimed in claim 17, further comprising:

a record-processing step of making the recording of the user data for the data area of said second recording layer subsequent to the recording of the user data for the modified data area of said first recording layer.

24. The method of recording information as claimed in claim 17, wherein said step of modifying data area records setting information regarding the size of the modified data area in a predetermined area of the information-recording medium.

25. The method of recording information as claimed in claim 17, wherein said information-recording medium is a DVD+R standards-compliant information-recording medium.

26. The method of recording information as claimed in claim 24, wherein said predetermined area for recording setting information regarding the size of the modified data area is a layer item within a SDCB (Session Disk Control Block).

27. A method of recording information for making a recording based on a request from an information-processing apparatus for recording of user data in an information-recording medium having a plurality of recording layers, each of the layers having a data area for recording the user data, and having a first recording layer to be a reference for determining a position of said data area in said each of the recording layers, and a second recording layer excluding the first recording layer, comprising:

a step of modifying the data area for making a setting regarding the size of the data area for said first recording layer within an extent of an initial-data area preset for said information-recording medium upon receiving a designation of modifying the data area from said information-processing apparatus.

28. The method of recording information as claimed in claim 27, wherein said information-recording medium is an information-recording medium to be recorded according to a Parallel Track Path (PTP) technique, and said step of modifying the data area sets a lead-out area following the data area to be set.

29. The method of recording information as claimed in claim 27, wherein said information-recording medium is an information-recording medium to be recorded according to an Opposite Track Path (OTP) technique, and said step of modifying the data area sets a middle area following the data area to be set.

30. The method of recording information as claimed in claim 27, wherein said step of modifying the data area sets, based on an address designation as the designation of modifying the data area, an end address of the data area of said first recording layer as the setting regarding the size of the data area.

31. The method of recording information as claimed in claim 27, wherein said step of modifying the data area sets, based on an area-size designation as the designation of modifying the data area, an area size of the data area of said first recording layer as the setting regarding the size of the data area.

32. The method of recording information as claimed in claim 27, wherein said step of modifying the data area sets, based on a designation with a notification of a completion of the recording on said first layer as the designation of modifying the data area, a size of recorded area of said first recording layer as the setting regarding the size of the data area.

33. The method of recording information as claimed in claim 27, further comprising:

a record-processing step of making the recording of the user data for the data area of said second recording layer subsequent to the recording of the user data for the modified data area of said first recording layer.

34. The method of recording information as claimed in claim 27, wherein said step of modifying the data area records setting information regarding the size of the modified data area in a predetermined area of the information-recording medium.

35. The method of recording information as claimed in claim 27, wherein said information-recording medium is a DVD+R standards-compliant information-recording medium.

36. The method of recording information as claimed in claim 34, wherein said predetermined area for recording setting information regarding the size of the modified data area is a layer item within a SDCB (Session Disk Control Block).

37. A computer-usable medium having a program for recording information being installed in a computer provided in an information-recording apparatus for making a recording based on a request from an information-processing apparatus for recording of user data in an information-recording medium having a plurality of recording layers, each of the layers having a data area for recording the user data, and having a first recording layer to be a reference for determining a position of said data area in said each of the layers, and a second recording layer excluding the first recording layer, and causing said computer, to execute a function of modifying the data area for making a setting regarding the size of the data area for said first recording layer within an extent of an initial-data area preset for said information-recording medium upon receiving a designation of modifying of the data area from said information-processing apparatus.

38. The computer-usable medium having a program for recording information as claimed in claim 37, wherein said information-recording medium is an information-recording medium to be recorded according to a Parallel Track Path (PTP) technique, and said function of modifying the data area sets a lead-out area following the data area to be set.

39. The computer-usable medium having a program for recording information as claimed in claim 37, wherein said information-recording medium is an information-recording medium to be recorded according to an Opposite Track Path (OTP) technique, and said function of modifying the data area sets a middle area following the data area to be set.

40. The computer-usable medium having a program for recording information as claimed in claim 37, wherein said function of modifying data area sets, based on an address designation as the designation of modifying the data area, an end address of the data area of said first recording layer as the setting regarding the size of the data area.

41. The computer-usable medium having a program for recording information as claimed in claim 37, wherein said function of modifying the data area sets, based on an area-size designation as the designation of modifying the data area, an area size of the data area of said first recording layer as the setting regarding the size of the data area.

42. The computer-usable medium having a program for recording information as claimed in claim 37, wherein said function of modifying the data area sets, based on a designation with a notification of a completion of the recording on said first layer as the designation of modifying the data area, a size of recorded area of said first recording layer as the setting regarding the size of the data area.

43. The computer-usable medium having a program for recording information as claimed in claim 37 for causing said computer to execute a record-processing function of making the recording of the user data for the data area of said second recording layer subsequent to the recording of the user data for the modified data area of said first recording layer.

44. The computer-usable medium having a program for recording information as claimed in claim 37, wherein said function of modifying the data area records setting information regarding the size of the modified data area in a predetermined area of the information-recording medium.

45. The computer-usable medium having a program for recording information as claimed in claim 37, wherein said information-recording medium is a DVD+R standards-compliant information-recording medium.

46. The computer-usable medium having a program for recording information as claimed in claim 44, wherein said predetermined area is a layer item within a SDCB (Session Disk Control Block).

47. A method of recording information for recording in an information-recording medium having a plurality of recording layers, each of the layers having a data area for recording user data, comprising:

modifying a data area on a first recording layer within an extent of an initial-data area preset for said information-recording medium;

setting a first address of a data area on a second recording layer being the inverse of a last address of said data area on said first recording layer; and shifting a start address of a middle area on said first recording layer following the last address of said data area on said first recording layer, a last address of a middle area on said second recording layer being the inverse of said start address of said middle area on said first recording layer;

wherein said information-recording medium is an information-recording medium to be recorded according to an Opposite Track Path (OTP) technique.

48. A method of recording information for recording in an information-recording medium having a plurality of recording layers, each of the layers having a data area for recording user data, comprising:

modifying a data area on a first recording layer within an extent of an initial-data area preset for said information-recording medium;

setting a first position of a data area on a second recording layer being the same radial position as a last position of said data area on said first recording layer; and shifting a start position of a middle area on said first recording layer following said last position of said data area on said first recording layer, a last position of a middle area on said second recording layer being the same radial position as said start position of said middle area on said first recording layer;

wherein said information-recording medium is an information-recording medium to be recorded according to an Opposite Track Path (OTP) technique.

49. A computer-usable medium having a program for recording information being installed in a computer provided in an information-recording apparatus for making a recording based on a request from an information-processing apparatus for recording of user data in an information-recording medium having a plurality of recording layers, each of the layers having a data area for recording user data, and having a first recording layer to be a reference for determining a position of said data area in said each of the layers, and a second recording layer excluding the first recording layer, and causing said computer to:

modify a data area on said first recording layer within an extent of an initial-data area preset for said information-recording medium;

set a first address of a data area on said second recording layer being the inverse of a last address of said data area on said first recording layer; and shift a start address of a middle area on said first recording layer following the last address of said data area on said first recording layer, a last address of a middle area on said second recording layer being the inverse of said start address of said middle area on said first recording layer;

wherein said information-recording medium is an information-recording medium to be recorded to an Opposite Track Path (OTP) technique.

50. A computer-usable medium having a program for recording information being installed in a computer provided in an information-recording apparatus for making a recording based on a request from an information-processing apparatus for recording of user data in an information-recording medium having a plurality of recording layers, each of the layers having a data area for recording user data, and having a first recording layer to be a reference for determining a position of said data area in said each of the layers, and a second recording layer excluding the first recording layer, and causing said computer to:

modify a data area on said first recording layer within an extent of an initial-data area preset for said information-recording medium;

set a first position of a data area on said second recording layer being the same radial position as a last position of said data area on said first recording layer; and shift a start position of a middle area on said first recording layer following said last position of said data area on said first recording layer, a last position of a middle area on said second recording layer being the same radial position as said start position of said middle area on said first recording layer;

wherein said information-recording medium is an information-recording medium to be recorded according to an Opposite Track Path (OTP) technique.

* * * * *